United States Patent
Amano et al.

(10) Patent No.: US 9,114,698 B2
(45) Date of Patent: Aug. 25, 2015

(54) CONTROL APPARATUS AND CONTROL METHOD FOR VEHICLE

(75) Inventors: Masaya Amano, Toyota (JP); Kenji Uchida, Nagoya (JP); Shinjiro Ashida, Toyota (JP); Takaharu Hori, Anjo (JP); Naoya Kanada, Miyoshi (JP); Kenji Tahara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 367 days.

(21) Appl. No.: 13/597,878

(22) Filed: Aug. 29, 2012

(65) Prior Publication Data

US 2013/0049663 A1   Feb. 28, 2013

(30) Foreign Application Priority Data

Aug. 30, 2011   (JP) .................. 2011-186940

(51) Int. Cl.
| | |
|---|---|
| H02P 3/08 | (2006.01) |
| B60K 6/445 | (2007.10) |
| B60L 3/00 | (2006.01) |
| B60L 15/02 | (2006.01) |
| B60K 28/14 | (2006.01) |
| B60W 10/08 | (2006.01) |
| B60W 20/00 | (2006.01) |
| H02P 21/00 | (2006.01) |
| H02M 7/48 | (2006.01) |
| H02P 27/00 | (2006.01) |

(52) U.S. Cl.
CPC .................. *B60K 6/445* (2013.01); *B60K 28/14* (2013.01); *B60L 3/0007* (2013.01); *B60L 15/025* (2013.01); *B60W 10/08* (2013.01); *B60W 20/50* (2013.01); *B60L 2240/425* (2013.01); *B60L 2240/525* (2013.01); *Y02T 10/6239* (2013.01); *Y02T 10/643* (2013.01); *Y02T 10/7258* (2013.01)

(58) Field of Classification Search
USPC ........................................... 318/453
See application file for complete search history.

(56) References Cited

U.S. PATENT DOCUMENTS

| | | | |
|---|---|---|---|
| 2006/0175995 A1* | 8/2006 | Shinmura et al. | 318/139 |
| 2007/0200529 A1* | 8/2007 | Kaneko et al. | 318/801 |

(Continued)

FOREIGN PATENT DOCUMENTS

| | | | |
|---|---|---|---|
| JP | 63029391 U | | 2/1988 |
| JP | 09070196 A | * | 3/1997 |
| JP | 09215102 A | | 8/1997 |

(Continued)

*Primary Examiner* — Paul Ip
*Assistant Examiner* — Said Bouziane
(74) *Attorney, Agent, or Firm* — Gifford, Krass, Sprinkle, Anderson & Citkowski, P.C.

(57) ABSTRACT

When a vehicle collision is detected, a electric connection between a power supply and an input stage of an inverter is switched to the disconnected condition. Then, when a rotation speed of an alternating current motor is higher than an allowable rotation speed or a terminal voltage of a storage unit provided at the input stage is higher than an allowable terminal voltage, an exciting current command value is set at a value other than zero and a torque current command value is set at zero, and when the rotation speed is equal to or lower than the allowable rotation speed and the terminal voltage is equal to or lower than the allowable terminal voltage, both command values are set at zero. An exciting current component and a torque current component of an alternating current supplied from the inverter to the motor are controlled according to the set command values.

15 Claims, 11 Drawing Sheets

(56) References Cited

U.S. PATENT DOCUMENTS

| | | | |
|---|---|---|---|
| 2010/0213904 A1* | 8/2010 | Yamada | 320/166 |
| 2011/0050136 A1* | 3/2011 | Sumi et al. | 318/400.3 |

FOREIGN PATENT DOCUMENTS

| | | | | |
|---|---|---|---|---|
| JP | 11308704 A | * | 11/1999 | |
| JP | 2004-357412 A | | 12/2004 | |
| JP | 2005-176580 A | | 6/2005 | |
| JP | 2007-195352 A | | 8/2007 | |
| JP | 2010093934 A | * | 4/2010 | |
| JP | 2010-130845 A | | 6/2010 | |
| JP | 2010130845 A | * | 6/2010 | |
| JP | 2010-183676 A | | 8/2010 | |
| JP | 2010183676 A | * | 8/2010 | |
| WO | WO 2010131353 A1 | * | 11/2010 | |

* cited by examiner

CONTROL APPARATUS AND CONTROL METHOD FOR VEHICLE

CROSS REFERENCE TO RELATED APPLICATIONS

This application claims priority to Japanese Patent Application No. 2011-186940 filed on Aug. 30, 2011, which is incorporated herein by reference in its entirety including the specification, drawings and abstract.

BACKGROUND OF THE INVENTION

1. Field of the Invention

The invention relates to a control apparatus and a control method for a vehicle.

2. Description of Related Art

With the recent increase in environmental protection awareness, the popularity of hybrid vehicles (HVs), electric automobiles (EV), and so on that have a motor installed as a drive source is becoming ever greater. Often in such vehicles, an alternating current motor is driven using a direct current power supply such as a lithium ion battery or another type of secondary battery as a power source.

When an alternating current motor is driven using a direct current power supply, as described above, an inverter is typically used to convert direct current power into alternating current power. Storage means (a condenser, a capacitor, or the like, for example) are provided at an input stage of the inverter, or in other words on the direct current power supply side, to smooth an output of the direct current power supply. Further, means (a relay or the like, for example) are typically provided between the direct current power supply and the inverter to open and close an electric connection between these two components. During an operation performed on the inverter or the motor for the purpose of maintenance, inspection, repair, and so on, the relay is opened prior to the operation to disconnect the inverter or the motor from the power supply. Further, when a charge is stored in the storage means provided at the input stage of the inverter, the aforementioned operations may be difficult, and therefore the charge must be discharged from the storage means after switching the relay OFF.

Discharging the storage means only when a rotation speed of the motor has fallen to or below a predetermined rotation speed has been proposed in the related art (see Japanese Patent Application Publication No. 2010-130845 (JP-2010-130845 A), for example).

When a vehicle installed with a motor as a drive source collides such that the vehicle is in an overturned condition or the like, for example, the motor may continue to rotate as tires spin and so on. Likewise in this condition, the charge needs to be discharged from the storage means quickly after opening the relay between the direct current power supply and the inverter in order to perform an operation, for example.

SUMMARY OF THE INVENTION

The invention provides a control apparatus and a control method for a vehicle with which, when a vehicle installed with a permanent magnet synchronous motor as a drive source collides, a charge stored in a storage unit provided in an inverter can be discharged quickly while suppressing unintentional torque generation in the motor.

A first aspect of the invention relates to a control apparatus for a vehicle including: an alternating current motor constituted by a permanent magnet synchronous motor; a power supply that supplies a direct current; an inverter that converts the direct current supplied from the power supply to an input stage of the inverter into an alternating current and supplies the alternating current to the alternating current motor; a storage unit provided at the input stage of the inverter; and a switch unit that switches an electric connection between the power supply and the input stage of the inverter between a disconnected condition and a conductive condition. The control apparatus includes: a switching control unit that controls the switch unit; a current setting unit that sets an exciting current command value that is a target value of an exciting current component and a torque current command value that is a target value of a torque current component in accordance with an output required of the alternating current motor, wherein the exciting current component is a current component of the alternating current, supplied from the inverter to the alternating current motor, that is used to excite the alternating current motor and the torque current component is a current component of the alternating current, supplied from the inverter to the alternating current motor, that is used to apply torque to the alternating current motor; a current control unit that controls the exciting current component and the torque current component in accordance with the exciting current command value and the torque current command value; and a collision detection unit that detects a collision of the vehicle, wherein: when the collision of the vehicle is detected by the collision detection unit, the switching control unit controls the switch unit to switch the electric connection between the power supply and the input stage of the inverter to the disconnected condition; when a rotation speed of the alternating current motor is higher than an allowable rotation speed or a terminal voltage of the storage unit is higher than an allowable terminal voltage after the collision of the vehicle is detected by the collision detection unit, the current setting unit sets the exciting current command value at an exciting current discharge value determined at a value other than zero and sets the torque current command value at zero; and when the rotation speed of the alternating current motor is equal to or lower than the allowable rotation speed and the terminal voltage of the storage unit is equal to or lower than the allowable terminal voltage after the collision of the vehicle is detected by the collision detection unit, the current setting unit sets both the exciting current command value and the torque current command value at zero.

A second aspect of the invention relates to a control method for a vehicle including: an alternating current motor constituted by a permanent magnet synchronous motor; a power supply that supplies a direct current; an inverter that converts the direct current supplied from the power supply to an input stage of the inverter into an alternating current and supplies the alternating current to the alternating current motor; a storage unit provided at the input stage of the inverter; and a switch unit that switches an electric connection between the power supply and the input stage of the inverter between a disconnected condition and a conductive condition. The control method includes: setting an exciting current command value that is a target value of an exciting current component and a torque current command value that is a target value of a torque current component in accordance with an output required of the alternating current motor, wherein the exciting current component is a current component of the alternating current, supplied from the inverter to the alternating current motor, that is used to excite the alternating current motor and the torque current component is a current component of the alternating current, supplied from the inverter to the alternating current motor, that is used to apply torque to the alternating current motor; controlling the exciting current component and the torque current component in accordance with the exciting current command value and the torque current command value; detecting a collision of the vehicle; controlling the switch unit to switch the electric connection between the power supply and the input stage of the inverter to the disconnected condition when the collision of the vehicle is detected; setting the exciting current command value at an exciting current discharge value determined at a value other than zero and setting the torque current command value at zero when a rotation speed of the alternating current motor is higher than an allowable rotation speed or a terminal voltage of the storage unit is higher than an allowable terminal voltage after the collision of the vehicle is detected; and setting both the exciting current command value and the torque current command value at zero when the rotation speed of the alternating current motor is equal to or lower than the allowable rotation speed and the terminal voltage of the storage unit is equal to or lower than the allowable terminal voltage after the collision of the vehicle is detected.

According to the configurations described above, when a vehicle installed with a permanent magnet synchronous motor as a drive source collides, a charge stored in the storage unit provided in an inverter can be discharged quickly while suppressing unintentional torque generation in the motor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
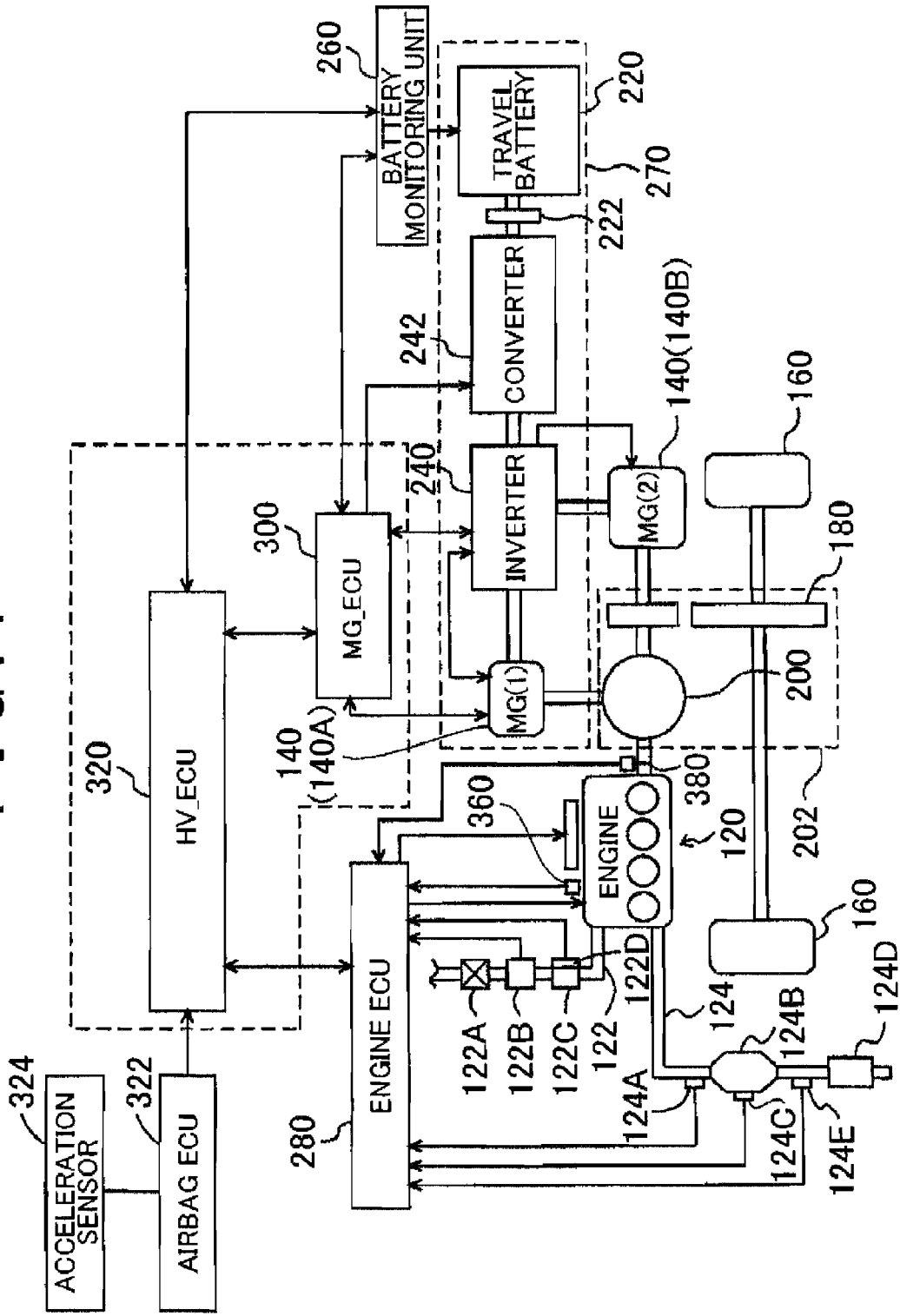
FIG. 1 is a control block diagram showing a configuration of a HV according to a first embodiment of the invention.

When an alternating current motor is driven using a direct current power supply, as in an HV or an EV in which a motor is installed as a drive source, an inverter is typically used to convert direct current power into alternating current power. Storage means is provided at an input stage of the inverter. As described above, during an operation performed on the inverter or the motor for the purpose of maintenance, inspection, repair, and so on, a charge needs to be discharged from the storage means after opening a relay in order to disconnect the inverter or the motor from the power supply.

A method using a discharge resistor may be cited as the simplest method of discharging the storage means. In this method, for example, the storage means is discharged by inserting the discharge resistor into a circuit at the same time as the relay between the direct current power supply and the inverter is opened. When the effects of power consumption and the like generated by the discharge resistor are small, the discharge resistor may be inserted into the circuit at all times. With this method, however, the discharge resistor and means (a relay or the like, for example) for inserting the discharge resistor into the circuit are required, and therefore this method is not suitable for achieving a reduction in apparatus size, simplification, and an improvement in reliability. Hence, it has been proposed in the related art that the charge stored in the storage means be discharged by operating the inverter after opening the relay between the direct current power supply and the inverter such that a current is supplied to a winding of the motor from the storage means (see Japanese Utility Model Application No. 66-029391 (JP-66-029391 U), for example).

When the storage means is discharged using a resistance of the motor winding in this manner, the operation of the inverter needs to be controlled to ensure that the motor does not rotate. The motor used in JP-66-029391 U, for example, is an induction motor, and therefore a current may be passed through the winding to ensure that an alternating magnetic field is not generated in the motor. However, when a permanent magnet motor, or in other words a synchronous motor (a permanent magnet synchronous motor) that is excited by a permanent magnet, is used as the motor, rotation of the motor cannot be stopped by passing a current through the winding to ensure that an alternating magnetic field is not generated in the motor. In other words, torque is applied to the motor by linkage between a magnetic field generated by the permanent magnet and a magnetic field generated by the winding current. The torque generated in this manner, although not particularly large, may cause the motor to vibrate, thereby causing discomfort to a user.

Hence, a vector apparatus including command setting means and control means to be described below, for example, has been proposed in the technical field. The command setting means sets an exciting current command Id* and a torque current command Iq* in accordance with a required motor output when the inverter is connected to the direct current power supply. The control means controls an exciting current component Id in accordance with the exciting current command Id*, and controls a torque current component Iq in accordance with the torque current command Iq*. Here, the exciting current component Id is a component of a motor current supplied from the inverter to the motor that is used to excite the motor together with the permanent magnet, while the torque current component Iq is a component of the motor current supplied from the inverter to the motor that is used to apply torque to the motor. In the vector control apparatus, when the inverter is not connected to the direct current power supply, the command setting means sets the exciting current command Id* at not zero ($\neq 0$) and sets the torque current command Iq* at substantially zero ($=0$) at least until discharge of the storage means in the inverter can be considered substantially complete. Consequently, the control means controls the torque current component Iq in accordance with the torque current command Iq* set at substantially zero. Hence, according to this vector control apparatus, rotation and vibration of the motor are suppressed by setting the torque at substantially zero (see Japanese Patent Application Publication No. 09-070196 (JP-09-070196 A), Japanese Patent Application Publication No. 2004-357412 (JP-2004-357412 A), Japanese Patent Application Publication No. 2005-176580 (JP-2005-176580 A), and Japanese Patent Application Publication No. 2007-195352 (JP-2007-195352 A), for example).

Further, it has been proposed in the technical field that current control be performed asynchronously to a phase of the motor by applying a current having a high frequency to the exciting current command Id* and the torque current command Iq*, for example, when a supply of power from the power supply to the motor is cut off. According to this current control, the charge stored in the storage means is discharged without applying torque to the motor (see Japanese Patent Application Publication No. 09-215102 (JP-09-215102 A), for example).

Furthermore, it has been proposed in the technical field that when a vehicle collision is detected in a vehicle installed with a motor as a drive source, an inverter of the motor be controlled by setting a frequency command value at a frequency at which loss of synchronism occurs in the motor so that the power in the storage means is consumed by the motor. According to this motor control, the charge in the storage means can be discharged by loss of the current flowing to the motor while suppressing unintentional torque generation in the motor (see Japanese Patent Application Publication No. 2010-183676 (JP-2010-183676 A), for example).

It has also been proposed in the technical field that the charge stored in the storage means of the inverter be discharged irrespective of the presence or absence of a motor by passing the charge stored in the storage means through a switching element circuit of the inverter as a displacement current (see Japanese Patent Application Publication No. 2010-130845 (JP-2010-130845 A), for example).

Hence, various techniques for discharging a charge stored in storage means while suppressing unintentional torque generation in a motor have been proposed in the related art. In all of these techniques, however, it is assumed that the motor is basically stopped.

When a vehicle installed with a motor as a drive source collides such that the vehicle is in an overturned condition or the like, for example, the motor may continue to rotate as the tires spin and so on. When the motor is a permanent magnet synchronous motor, a counter-electromotive voltage may be generated as the motor rotates even after the vehicle collision is detected and the supply of power from the power supply to the motor is cut off. As a result, a voltage of the storage means does not decrease. As described above, however, in such situations the charge stored in the storage means must be discharged quickly after opening the relay between the direct current power supply and the inverter in order to perform an operation, for example.

A HV, an EV, and so on installed with a motor as a drive source may be cited as examples of the vehicle to which the vehicle control apparatus according to the first aspect of the invention, described above, is applied.

The vehicle includes at least one alternating current motor constituted by a permanent magnet synchronous motor as a drive source. In other words, the vehicle may be a front wheel drive vehicle including two alternating current motors or a four wheel drive vehicle including three or more alternating current motors. The vehicle may also be a two-wheeled vehicle including one or more alternating current motors.

In these vehicles, the alternating current motor is typically driven using a direct current power supply such as a lithium ion battery or another secondary battery as a power supply. The power supply of the vehicle to which the vehicle control apparatus according to this aspect is applied may be any type of direct current power supply, and is not limited to a secondary battery such as a lithium ion battery.

In the vehicle described above, the alternating current motor constituted by a permanent magnet synchronous motor is driven using the direct current power supply described above as a power supply. Accordingly, the vehicle includes an inverter that converts a direct current supplied from the direct current power supply into an alternating current. A storage unit is provided at an input stage of the inverter, and the direct current is supplied to the input stage from the power supply. The inverter converts the direct current into an alternating current and supplies the alternating current to the one or more alternating current motors. The vehicle includes at least an identical number of inverters to the number of alternating current motors.

The inverter has a configuration that is well available in the technical field, and therefore the configuration will not be described in detail here. Briefly, however, the inverter includes, for example, the storage unit that smooths an output of the direct current power supply, a plurality of pairs of switching elements connected respectively to respective terminals of the storage unit, and rectifying elements connected in parallel with the respective switching elements. The inverter converts the direct current power of the direct current power supply into alternating current power by ON/OFF controlling the switching elements. Insulated gate bipolar transistors (IGBTs), for example, may be used as the switching elements. Further, diodes, for example, may be used as the rectifying elements.

The storage unit disposed at the input stage of the inverter is constituted by a capacitor or the like, for example, and functions to smooth the output of the direct current power supply. More specifically, the storage unit smooths a direct current voltage supplied to the inverter from the direct current power supply by performing charging and discharging in accordance with variation in the direct current voltage. Hence, a large amount of charge may remain in the storage unit even when an electric connection between the power supply and the input stage of the inverter is disconnected by a switch unit upon completion of vehicle travel, and as a result, a terminal voltage VH of the storage unit may remain high. When the terminal voltage VH of the storage unit is high, operations performed on the inverter or the motor for the purpose of maintenance, inspection, repair, and so on may be difficult. It is therefore necessary to discharge the charge from the storage unit quickly when vehicle travel is complete.

The aforesaid switch unit is constituted by a relay or the like, for example, and used to switch the electric connection between the power supply and the input stage of the inverter between a disconnected condition and a conductive condition. The switch unit may be constituted by a so-called system main relay (SMR). The switch unit disconnects the electric connection between the power supply and the (input stage of the) inverter when the vehicle collides or when an ignition switch is switched OFF by a driver or the like, for example. In the vehicle control apparatus described above, the switch unit is controlled by the switching control unit.

The alternating current supplied to the alternating current motor from the inverter can be decomposed into an exciting current component Id and a torque current component Iq. The exciting current component Id is a component for exciting the alternating current motor together with the permanent magnet provided in the alternating current motor. The torque current component Iq, meanwhile, is a component for applying torque to the alternating current motor. In the vehicle control apparatus described above, the current setting unit sets an exciting current command value Id*, which is a target value of the exciting current component Id, and a torque current command value Iq* which is a target value of the torque current component Iq, in accordance with an output required of the alternating current motor. When the vehicle includes a plurality of alternating current motors, the exciting current command value Id* and the torque current command value Iq* are set for each of the plurality of alternating current motors. The current control unit then controls the exciting current component Id and the torque current component Iq in accordance with the exciting current command value Id* and the torque current command value Iq*. When the vehicle includes a plurality of inverters, the exciting current component Id and the torque current component Iq are controlled in relation to each of the plurality of inverters.

More specifically, for example, an electronic control unit (ECU) installed in the vehicle calculates the exciting current command Id* and the torque current command Iq* on the basis of input signals such as an accelerator signal, a brake signal, and a shift position signal. The ECU then controls a current flowing to each phase winding of the alternating current motor by generating a pulse width modulation (PWM) signal, for example, on the basis of the calculated exciting current command Id* and torque current command Iq*. When the alternating current motor is a three phase motor, the ECU may realize this control by converting respective phase currents Iu, Iv, Iw of the motor into the exciting current component Id and the torque current component Iq, and converting an exciting voltage command Vd* (and therefore the exciting current command Id*) and a torque voltage command Vq* (and therefore the torque current command Iq*) into respective phase voltage commands Vu*, Vv*, Vw* (and therefore respective phase current commands Iu*, Iv*, Iw*). Note, however, that the aspect of the invention may also be applied to a vector control method in which the current supplied to the alternating current motor is not decomposed into the exciting current component Id and the torque current component Iq.

The vehicle control apparatus also includes the collision detection unit that detects a vehicle collision. The collision detection unit may determine that a vehicle collision has occurred on the basis of acceleration variation occurring during a vehicle collision or the like, which is detected by an acceleration sensor, for example. In this case, the acceleration sensor may detect acceleration in a front-rear direction of the vehicle, acceleration in a width direction of the vehicle, or acceleration in both the front-rear direction and the width direction of the vehicle, for example. Further, the collision detection unit may determine that a vehicle collision has occurred when an absolute value of the acceleration detected by the acceleration sensor reaches or exceeds a predetermined threshold.

Note, however, that the vehicle collision determination made by the collision detection unit is not limited to a determination based on the vehicle acceleration detected by the acceleration sensor, as described above. For example, the collision detection unit may determine whether or not a vehicle collision has occurred on the basis of vehicle contact detected by a contact sensor, a distance to an object existing in a movement direction of the vehicle, detected by a millimeter wave radar or the like, and so on. Moreover, the collision detection unit may use a determination result obtained from a system that is activated upon detection of a vehicle collision, such as an airbag system, for example.

In the vehicle control apparatus described above, when a vehicle collision is detected by the collision detection unit, the switching control unit controls the switch unit to switch the electric connection between the power supply and the input stage of the inverter to the disconnected condition. Further, when a vehicle collision is detected by the collision detection unit, the current setting unit sets the exciting current command value Id* and the torque current command value Iq* as follows.

(i) When a rotation speed of the alternating current motor is higher than a predetermined allowable rotation speed Ra or when the terminal voltage VH of the storage unit is higher than a predetermined allowable terminal voltage VHa, the current setting unit sets the exciting current command value Id* at an exciting current discharge value Idd that is determined in advance at a value other than zero, and sets the torque current command value Iq* at zero. In case the vehicle includes a plurality of alternating current motors, when either the rotation speed is higher than the allowable rotation speed Ra or the terminal voltage VH of the storage unit is higher than the allowable terminal voltage VHa with respect to any one of the alternating current motors, the exciting current command value Id* and the torque current command value Iq* of the alternating current supplied to this one alternating current motor are set as described above.

(ii) When the rotation speed of the alternating current motor is equal to or lower than the allowable rotation speed Ra or the terminal voltage VH of the storage unit is equal to or lower than the allowable terminal voltage VHa, the exciting current command value Id* and the torque current command value Iq* are both set at zero. When, in a case where the vehicle includes a plurality of alternating current motors, the rotation speed is equal to or lower than the allowable rotation speed Ra and the terminal voltage VH of the storage unit is equal to or lower than the allowable terminal voltage VHa with respect to all of the alternating current motors, the exciting current command value Id* and the torque current command value Iq* of the alternating currents supplied to all of the alternating current motors are set as described above.

The rotation speed of the alternating current motor may be detected by a rotation speed detection unit provided in the alternating current motor, for example. The rotation speed detection unit may calculate the rotation speed of the alternating current motor on the basis of a position sensor signal indicating a position θ of a rotor of the alternating current motor. The position θ of the rotor of the alternating current motor may be detected by a rotor position sensor such as a resolver or an encoder, for example.

Further, the allowable rotation speed Ra may be defined as a maximum rotation speed of a rotation speed range in which a counter-electromotive voltage generated by the rotation of the alternating current motor is at zero or a low level having substantially no effect, for example. Hence, a case in which the rotation speed of the alternating current motor is higher than the predetermined allowable rotation speed Ra corresponds to a case in which the counter-electromotive voltage generated by the rotation of the alternating current motor is sufficiently high to have a substantial effect such as causing the storage unit to be charged by the counter-electromotive voltage, for example.

The terminal voltage VH of the storage unit may be detected by a voltage detection unit such as a voltage sensor provided between the terminals of the storage unit, for example. The allowable terminal voltage VHa may be defined as a maximum terminal voltage of a terminal voltage range in which the terminal voltage VH of the storage unit is at a level where operations performed on the inverter or the motor for the purpose of maintenance, inspection, repair, and so on, for example, do not become difficult. Hence, a case in which the terminal voltage VH of the storage unit is higher than the predetermined allowable terminal voltage VHa corresponds to a case in which the terminal voltage VH of the storage unit is high enough that operations performed on the inverter or the motor for the purpose of maintenance, inspection, repair, and so on, for example, may be difficult.

As described above, when the rotation speed of the alternating current motor is higher than the allowable rotation speed Ra or the terminal voltage VU of the storage unit is higher than the allowable terminal voltage VHa, the counter-electromotive voltage generated by the rotation of the alternating current motor is high. Accordingly, the storage unit may be charged such that discharge of the storage unit cannot be performed quickly, for example, and as a result, operational problems are more likely to occur during operations performed on the inverter or the motor for the purpose of maintenance, inspection, repair, and so on.

Hence, when the alternating current motor rotation speed is higher than the allowable rotation speed Ra in a situation such as that described above, the charge stored in the storage unit needs to be discharged quickly in order to lower the terminal voltage VH of the storage unit rapidly while canceling out the counter-electromotive voltage generated by the rotation of the alternating current motor. However, when the alternating current provided to the alternating current motor is further increased in order to discharge the charge stored in the storage unit, torque may be generated in the alternating current motor unintentionally.

Therefore, in the vehicle control apparatus according to this aspect, in a case such as that described above, the exciting current command value Id* is set at the exciting current discharge value Idd other than zero, and the torque current command value Iq* is set at zero. In so doing, in the vehicle control apparatus according to this aspect, torque generated in the alternating current motor unintentionally can be reduced to substantially zero, and as a result, the charge stored in the storage unit can be discharged quickly by loss of the current flowing to the alternating current motor while suppressing rotation and vibration of the alternating current motor.

Note that the exciting current discharge value Idd may be set appropriately on the basis of a capacity of the storage unit, a generation efficiency of the alternating current motor, a wiring capacity of the inverter and the alternating current motor, and so on, for example. Further, the exciting current discharge value Idd may be set at different values in accordance with a unit voltage VH of the storage unit and the rotation speed of the alternating current motor (and therefore the counter-electromotive voltage generated by the rotation of the alternating current motor). For example, the exciting current discharge value Idd may be set at a steadily higher value as the unit voltage VH of the storage unit increases or the rotation speed of the alternating current motor (and therefore the counter-electromotive voltage generated by the rotation of the alternating current motor) increases. Alternatively, the exciting current discharge value Idd may be set to vary in response to variation in the unit voltage VH of the storage unit and the rotation speed of the alternating current motor (and therefore the counter-electromotive voltage generated by the rotation of the alternating current motor). For example, the exciting current discharge value Idd may be set to vary to a steadily higher value as the unit voltage VH of the storage unit and the rotation speed of the alternating current motor (and therefore the counter-electromotive voltage generated by the rotation of the alternating current motor) increase.

When, on the other hand, the rotation speed of the alternating current motor is equal to or lower than the allowable rotation speed Ra and the terminal voltage VH of the storage unit is equal to or lower than the allowable terminal voltage VH, the counter-electromotive voltage generated by the rotation of the alternating current motor is low, the terminal voltage VH of the storage unit is low, and the counter-electromotive voltage generated by the rotation of the alternating current motor is low. It is therefore highly unlikely that an operational problem will occur during an operation performed on the inverter or the motor for the purpose of maintenance, inspection, repair, and so on, for example.

In this case, there is no need to discharge the charge stored in the storage unit in order to lower than the terminal voltage VH of the storage unit. In other words, there is no need to pass a current through the alternating current motor and no need to consider unintentional torque generation in the alternating current motor. Hence, in the vehicle control apparatus according to this aspect, the exciting current command value Id* and the torque current command value Iq* are both set at zero in this case.

In the vehicle control apparatus according to this aspect, as described above, when the rotation speed of the alternating current motor is higher than the allowable rotation speed Ra or the terminal voltage VH of the storage unit is higher than the allowable terminal voltage VHa, the exciting current command value Id* is preferably set at as high a value as possible to ensure that the charge stored in the storage unit is discharged quickly.

However, when the exciting current command value Id* is set at an excessively high value, the inverter and the alternating current motor may overheat. When the inverter and the alternating current motor overheat, the inverter, the alternating current motor, or another device or the like disposed on the periphery thereof, for example, may be damaged. Therefore, the exciting current command value Id* is preferably set appropriately to ensure that the inverter and the alternating current motor do not overheat.

Hence, in the vehicle control apparatus according to the first aspect of the invention, the current setting unit may correct the exciting current command value Id* to a value equal to or lower than an exciting current upper limit value Idi when a temperature of the inverter is higher than a predetermined inverter upper limit temperature Ti.

According to this configuration, when the temperature of the inverter is higher than the inverter upper limit temperature Ti, the exciting current command value Id* is corrected to a value equal to or lower than the exciting current upper limit value Idi. Here, the exciting current upper limit value Idi is a value determined in advance in accordance with the temperature of the inverter. When, in a case where the vehicle includes a plurality of inverters, the temperature of any one of the plurality of inverters is higher than the inverter upper limit temperature Ti, the exciting current command value Id* supplied from this one inverter to the corresponding alternating current motor is corrected to a value equal to or lower than the exciting current upper limit value Idi.

The inverter upper limit temperature Ti may be set appropriately in accordance with configurations (materials and designs of constituent elements, for example) of the inverter and devices and the like on the periphery thereof, for example. Further, the exciting current upper limit value Idi may be set appropriately in accordance with the temperature of the inverter white taking into account heat loss, radiation efficiency, and so on in the inverter. Furthermore, a correspondence relationship between the temperature of the inverter and the exciting current upper limit value Idi may be determined in advance in the form of a function or a data map such as a data table, for example. In so doing, when the temperature of the inverter, detected by a temperature detection unit such as a temperature sensor, for example, is higher than the inverter upper limit temperature Ti, the exciting current upper limit value Idi corresponding to the inverter temperature can be specified by performing a calculation using the function or referring to the data map.

More specifically, on the basis of the specified exciting current upper limit value Idi, the ECU or the like installed in the vehicle, for example, corrects the exciting current command value Id* to a value equal to or lower than the exciting current upper limit value Idi. Hence, in the vehicle control apparatus according to this aspect, the temperature of the inverter is maintained at or below the inverter upper limit temperature Ti such that overheating of the inverter is suppressed. As a result, damage to the inverter and other devices and the like disposed on the periphery thereof, for example, is suppressed.

Overheating of the alternating current motor is preferably suppressed similarly to the inverter. When the alternating current motor overheats, the alternating current motor or another device or the like disposed on the periphery thereof, for example, may be damaged. Therefore, the exciting current command value Id* is preferably set appropriately to ensure that the alternating current motor does not overheat.

Hence, in the vehicle control apparatus according to the first aspect of the invention, when a temperature of the alternating current motor is higher than a predetermined motor upper limit temperature Tm, the current setting unit may correct the exciting current command value Id* to a value equal to or lower than an exciting current upper limit value Idm determined in advance in accordance with the temperature of the alternating current motor.

According to this configuration, when the temperature of the alternating current motor is higher than the motor upper limit temperature Tm, the exciting current command value Id* is corrected to a value equal to or lower than the exciting current upper limit value Idm. Here, the exciting current upper limit value Idm is a value determined in advance in accordance with the temperature of the alternating current motor. When, in a case where the vehicle includes a plurality of alternating current motors, the temperature of any one of the plurality of alternating current motors is higher than the motor upper limit temperature Tm, the exciting current command value Id* supplied to this one alternating current motor is corrected to a value equal to or lower than the exciting current upper limit value Idm.

The motor upper limit temperature Tm may be set appropriately in accordance with configurations (materials and designs of constituent elements, for example) of the alternating current motor and devices and the like on the periphery thereof, for example. Further, the exciting current upper limit value Idm may be set appropriately in accordance with the temperature of the alternating current motor while taking into account heat loss, radiation efficiency, and so on in the alternating current motor. Furthermore, a correspondence relationship between the temperature of the alternating current motor and the exciting current upper limit value Idm may be determined in advance in the form of a function or a data map such as a data table, for example. In so doing, when the temperature of the alternating current motor, detected by a temperature detection unit such as a temperature sensor, for example, is higher than the motor upper limit temperature Tm, the exciting current upper limit value Idm corresponding to the temperature of the alternating current motor can be specified by performing a calculation using the function or referring to the data map.

More specifically, on the basis of the specified exciting current upper limit value Idm, the ECU or the like installed in the vehicle, for example, corrects the exciting current command value Id* to a value equal to or lower than the exciting current upper limit value Idm. Hence, in the vehicle control apparatus according to this aspect, the temperature of the alternating current motor is maintained at or below the motor upper limit temperature Tm such that overheating of the alternating current motor is suppressed. As a result, damage to the alternating current motor and other devices and the like disposed on the periphery thereof, for example, is suppressed.

Incidentally, depending on operating conditions and the like prior to the vehicle collision, the temperatures of the inverter and the alternating current motor may increase beyond the respective upper limit temperatures (i.e. the inverter upper limit temperature Ti and the motor upper limit temperature Tm) simultaneously. In order to suppress overheating of both the inverter and the alternating current motor in this case, the exciting current command value Id* of the alternating current supplied from the inverter to the alternating current motor is preferably corrected to a value equal to or lower than one of the exciting current upper limit value Idi and the exciting current upper limit value Idm, which is lower than the other of the exciting current upper limit value Idi and the exciting current upper limit value Idm. Here, the exciting current upper limit value Idi and the exciting current upper limit value Idm are set on the basis of the respective temperatures of the inverter and the alternating current motor.

In the vehicle control apparatus according to the first aspect of the invention, when the temperature of the inverter is higher than the inverter upper limit temperature Ti and the temperature of the alternating current motor is higher than the motor upper limit temperature Tm, the current setting unit may correct the exciting current command value Id* to a value equal to or lower than one of the exciting current upper limit value Idi and the exciting current upper limit value Idm, which is lower than the other of the exciting current upper limit value Idi and the exciting current upper limit value Idm.

According to this configuration, when the temperature of the inverter is higher than the inverter upper limit temperature Ti and the temperature of the alternating current motor is higher than the motor upper limit temperature Tm, the exciting current command value Id* is corrected to a value a value equal to or lower than one of the exciting current upper limit value Idi and the exciting current upper limit value Idm, which is lower than the other of the exciting current upper limit value Idi and the exciting current upper limit value Idm. When, in a case where the vehicle includes a plurality of inverters, the temperature of any one of the plurality of inverters is higher than the inverter upper limit temperature Ti and the temperature of the alternating current motor to which an alternating current is supplied from this one inverter is higher than the motor upper limit temperature Tm, the exciting current command value Id* of the alternating current supplied to the alternating current motor from this one inverter is corrected to a value equal to or lower than one of the exciting current upper limit value Idi and the exciting current upper limit value Idm, which is lower than the other of the exciting current upper limit value Idi and the exciting current upper limit value Idm.

The inverter upper limit temperature Ti and the motor upper limit temperature Tm may be set as described above. Further, the exciting current upper limit value Idi and the exciting current upper limit value Idm may be set as described above. Furthermore, the correspondence relationship between the inverter temperature and the exciting current upper limit value Idi and the correspondence relationship between the temperature of the alternating current motor and the exciting current upper limit value Idm may be determined in advance as described above. In so doing, when the temperature of the inverter, detected by a temperature detection unit such as a temperature sensor, for example, is higher than the inverter upper limit temperature Ti and the temperature of the alternating current motor is higher than the predetermined motor upper limit temperature Tm, the exciting current upper limit value Idi and the exciting current upper limit value Idm corresponding to the respective temperatures of the inverter and the alternating current motor can be specified by performing a calculation using the function or referring to the data map.

More specifically, on the basis of the specified exciting current upper limit value Idi and exciting current upper limit value Idm, the ECU or the like installed in the vehicle, for example, specifies the lower exciting current value of the exciting current upper limit value Idi and the exciting current upper limit value Idm, and corrects the exciting current command value Id* to a value equal to or lower than the exciting current value thus specified. Hence, in the vehicle control apparatus according to this aspect, the temperature of the inverter and the temperature of the alternating current motor are maintained at or below the inverter upper limit temperature Ti and the motor upper limit temperature Tm, respectively, such that overheating of the inverter and the alternating current motor is suppressed. As a result, damage to the inverter, the alternating current motor, and other devices and the like disposed on the periphery thereof, for example, is suppressed.

Overheating of the inverter and the alternating current motor may be suppressed using a method other than that described above.

For example, in the respective configurations described above, when the rotation speed of the alternating current motor is higher than the allowable rotation speed Ra, the terminal voltage VH of the storage unit is lowered rapidly by setting the exciting current command value Id* at the exciting current discharge value Idd such that the charge stored in the storage unit is discharged quickly. For this purpose, the exciting current component Id is preferably supplied to the alternating current motor as soon as possible after the vehicle collision is detected.

However, when the exciting current component Id is supplied to the alternating current motor to discharge the charge stored in the storage unit in a case where the rotation speed of the alternating current motor is excessively high, a current derived from the counter-electromotive voltage generated by the rotation of the alternating current motor may be applied, and as a result, the current flowing to the inverter and the alternating current motor may become excessive. When the current flowing to the inverter and the alternating current motor is excessive, the inverter and the alternating current motor may overheat. Overheating of the inverter and the alternating current motor may cause problems such as damage to the inverter, the alternating current motor, and other devices and the like disposed on the periphery thereof, for example. Therefore, to ensure that the inverter and the alternating current motor do not overheat, a start timing at which the exciting current component Id is supplied to the alternating current motor is preferably delayed until the rotation speed of the alternating current motor has decreased and the counter-electromotive voltage generated by the rotation of the alternating current motor has decreased.

Hence, in the vehicle control apparatus according to the first aspect of the invention, when the rotation speed of the alternating current motor is equal to or higher than a predetermined upper limit rotation speed Rm that is higher than the allowable rotation speed Ra, the current setting unit may set the exciting current command value Id* at zero.

According to this configuration, when the rotation speed of the alternating current motor is equal to or higher than the upper limit rotation speed Rm after rising above the allowable rotation speed Ra, the exciting current command value Id* is set at zero. Here, the upper limit rotation speed Rm is a higher rotation speed than the allowable rotation speed Ra.

The upper limit rotation speed Rm may be set appropriately in accordance with a generation efficiency (a relationship between the rotation speed of the alternating current motor and a current induced by the rotation thereof) when the alternating current motor functions as a generator, the configurations (materials and designs of constituent elements, for example) of the alternating current motor and devices and the like on the periphery thereof, and so on, for example.

For example, when the current induced by the rotation of the alternating current motor is equal to or higher than the lower of the exciting current upper limit value Idi and the exciting current upper limit value Idm, the inverter or the alternating current motor may overheat, leading to problems such as damage to the inverter, the alternating current motor, and other devices and the like disposed on the periphery thereof, for example. In this case, when a further current is supplied to the alternating current motor in order to discharge the charge stored in the storage unit, the danger of overheating of the inverter or the alternating current motor, causing damage to the inverter, the alternating current motor, and other devices and the like disposed on the periphery thereof, and so on, for example, increases.

Hence, the exciting current command value Id* is preferably set at zero at least for a period during which the current induced by the rotation of the alternating current motor is equal to or higher than the lower of the exciting current upper limit value Idi and the exciting current upper limit value Idm. Accordingly, the rotation speed of the alternating current motor at the point where the current induced by the rotation of the alternating current motor matches the lower of the exciting current upper limit value Idi and the exciting current upper limit value Idm is set as the upper limit rotation speed Rm. By setting the exciting current command value Id* at zero while the rotation speed of the alternating current motor is equal to or higher than the upper limit rotation speed Rm, the problem described above can be reduced.

The upper limit rotation speed Rm may be set appropriately in accordance with the respective temperatures of the inverter and the alternating current motor, for example. Further, a correspondence relationship between the respective temperatures of the inverter and the alternating current motor and the upper limit rotation speed Rm may be determined in advance in the form of a function or a data map such as a data table, for example. In so doing, the upper limit rotation speed Rm corresponding to the respective temperatures of the inverter and the alternating current motor can be specified by performing a calculation using the function or referring to the data map on the basis of the temperature of the inverter or the alternating current motor, detected by a temperature detection unit such as a temperature sensor, for example. Then, when the rotation speed of the alternating current motor detected by the rotation speed detection unit is equal to or higher than the specified upper limit rotation speed Rm, the ECU installed in the vehicle, for example, may set the exciting current command value Id* at zero. Thus, in the vehicle control apparatus according to this aspect, overheating of the inverter and the alternating current motor is suppressed, with the result that damage to the inverter, the alternating current motor, and other devices and the like disposed on the periphery thereof, for example, is suppressed.

Note that from the viewpoint of protection and safety, or taking into consideration detection precision and control precision with regard to the rotation speed of the alternating current motor, the respective temperatures of the inverter and the alternating current motor, and the various current values, values such as the allowable rotation speed Ra, the allowable terminal voltage VHa, the exciting current upper limit value Idi, the exciting current upper limit value Idm, and the upper limit rotation speed Rm may be set at slightly lower values than the values set in the above description so as to provide a certain margin.

According to the respective configurations described above, in a case where a vehicle installed with an alternating current motor constituted by a permanent magnet synchronous motor as a drive source collides, a charge stored in a storage unit provided in an inverter that supplies an alternating current to the alternating current motor can be discharged quickly while suppressing unintentional torque generation in the alternating current motor, even when the alternating current motor continues to rotate as tires spin and so on. Further, by appropriately adjusting a magnitude and a supply timing of the exciting current component Id supplied to the alternating current motor, the charge stored in the storage unit can be discharged quickly while suppressing overheating of the inverter and the alternating current motor.

As described above in the second aspect of the invention, the invention also relates to a control method for quickly discharging a charge stored in a storage unit of an inverter that drives a motor when a vehicle installed with the motor as a drive source collides.

The vehicle control method according to the second aspect of the invention may further include correcting the exciting current command value Id* to a value equal to or lower than the exciting current upper limit value Idi determined in advance in accordance with the temperature of the inverter when the temperature of the inverter is higher than the predetermined inverter upper limit temperature Ti.

Further, the vehicle control method according to the second aspect of the invention may further include correcting the exciting current command value Id* to a value equal to or lower than the exciting current upper limit value Idm determined in advance in accordance with the temperature of the alternating current motor when the temperature of the alternating current motor is higher than the predetermined motor upper limit temperature Tm.

Furthermore, the vehicle control method according to the second aspect of the invention may further include correcting the exciting current command value Id* to a value equal to or lower than one of the exciting current upper limit value Idi determined in advance in accordance with the temperature of the inverter and the exciting current upper limit value Idm determined in advance in accordance with the temperature of the alternating current motor, which is lower than the other of the exciting current upper limit value Idi and the exciting current upper limit value Idm, when the temperature of the inverter is higher than the predetermined inverter upper limit temperature Ti and the temperature of the alternating current motor is higher than the predetermined motor upper limit temperature Tm.

In addition, the vehicle control method according to the second aspect of the invention may further include setting the exciting current command value Id* at zero when the rotation speed of the alternating current motor is equal to or higher than the upper limit rotation speed Ram determined in advance to be higher than the allowable rotation speed Ra.

According to the above configurations, in a case where a vehicle installed with an alternating current motor constituted by a permanent magnet synchronous motor as a drive source collides, a charge stored in a storage unit provided in an inverter that supplies an alternating current to the alternating current motor can be discharged quickly while suppressing unintentional torque generation in the alternating current motor, even when the alternating current motor continues to rotate as tires spin and so on. Further, by appropriately adjusting the magnitude and the supply timing of the exciting current component Id supplied to the alternating current motor, the charge stored in the storage unit can be discharged quickly while suppressing overheating of the inverter and the alternating current motor.

Configurations, characteristics, and so on of the control apparatus and control method for a vehicle according to the invention will be described below with reference to the attached drawings and so on. Note, however, that the following description is provided merely as an example, and the scope of the invention is not to be interpreted as being limited to the following description.

(1) Configuration of an HV to which the Invention is Applied

A first embodiment of the invention will be described below with reference to the drawings. In the following description, identical reference symbols are allocated to constituent elements having identical names and functions. Accordingly, detailed description of constituent elements having identical reference symbols will not be repeated.

FIG. 1 is a control block diagram showing a configuration of an HV according to the first embodiment of the invention. Note that in this embodiment, an HV will be described as an example, but the invention is not limited to an HV and may be applied to any vehicle installed with an alternating current motor as a drive source. In other words, the invention may also be applied to an EV, a fuel cell vehicle (FCV), and so on.

The HV includes an internal combustion engine (to be referred to hereafter as an engine) 120 serving as a drive source, a motor/generator (MG) 140 serving as an alternating current motor, and a transmission 202 connected to the engine 120 and the M/G. Note that for ease of description, the M/G 140 is shown as a generator 140A and a motor 140B in FIG. 1, but depending on traveling conditions of the HV, the generator 140A may function as a motor and the motor 140B may function as a generator. The M/G 140 is an alternating current motor that is controlled by vector control or the like for controlling an exciting current component Id and a torque current component Iq on the basis of an exciting current command Id* and a torque current command Iq*, respectively. In the vector control, the exciting current component Id is a component of a motor current supplied from an inverter to a motor that is used to excite the motor together with a permanent magnet, while the torque current component Iq is a component of the motor current that is used to apply torque to the motor. Further, the exciting current command Id* and the torque current command Iq* are set in accordance with a required motor output.

Note that in this embodiment, the HV will be described as a front wheel drive vehicle, but the HV may be a rear wheel drive vehicle. Alternatively, the HV may be a four wheel drive vehicle in which a third motor (a rear motor) is provided on a rear wheel to generate driving force. Further, in this embodiment, the engine 120 will be described as a gasoline engine such as a lean burn gasoline engine, but the engine 120 may be a diesel engine.

An air cleaner 122A that traps dust and the like in intake air, an air flow meter 122B that detects an amount of air taken into the engine 120 through the air cleaner 122A, and an electronic throttle 122C having a throttle valve for adjusting the amount of air taken into the engine 120 are provided in an intake passage 122 of the engine 120. The electronic throttle 122C is provided with a throttle position sensor 122D. Detection signals indicating the intake air amount detected by the air flow meter 12213, an opening of the electronic throttle 1220 detected by the throttle position sensor 122D, and so on are input into an engine ECU 280.

The engine 120 includes a plurality of cylinders and a fuel injection device (not shown) that supplies fuel to each of the plurality of cylinders. The fuel injection device injects an appropriate amount of fuel into the respective cylinders at an appropriate timing on the basis of a fuel injection control signal from the engine ECU 280.

Further, a three-way catalytic converter 124B serving as an exhaust gas purification catalyst, an air-fuel (A/F) ratio sensor 124A that detects an A/F ratio of exhaust gas introduced into the three-way catalytic converter 124B, a catalyst temperature sensor 1240 that detects a temperature of the three-way catalytic converter 124B, a silencer 124D, and an oxygen sensor 124E that detects an oxygen concentration of the exhaust gas discharged from the three-way catalytic converter 124B are provided in an exhaust passage 124 of the engine 120.

Detection signals indicating the A/F ratio of the exhaust gas introduced into the three-way catalytic converter 124B, detected by the A/F ratio sensor 124A, the temperature of the three-way catalytic converter 124B, detected by the catalyst temperature sensor 124C, the oxygen concentration of the exhaust gas discharged from the three-way catalytic converter 124B, detected by the oxygen sensor 124E, and so on are input into the engine ECU 280. Note that an oxygen sensor may be used instead of the A/F ratio sensor 124A and an A/F ratio sensor may be used instead of the oxygen sensor 124E.

Further, a signal indicating an engine cooling water temperature is input into the engine ECU 280 from a water temperature detection sensor 360 that detects a temperature of cooling water in the engine 120. A crank position sensor 380 is provided on an output shaft of the engine 120, and a signal indicating a rotation speed of the output shaft is input into the engine ECU 280 from the crank position sensor 380.

The transmission 202 includes a reduction gear 180 and a power distribution mechanism 200. The reduction gear 180 transmits power generated by the engine 120 and the M/G 140 to a vehicle wheel 160 and transmits drive from the vehicle wheel 160 to the engine 120 and the M/G 140. The power distribution mechanism 200 is a planetary gear mechanism, for example. The power distribution mechanism 200 distributes the power generated by the engine 120 between the vehicle wheel 160 (i.e. the motor 140B) and the generator 140A. The planetary gear mechanism includes a sun gear, a ring gear, a carrier, and a pinion gear. In the planetary gear mechanism, for example, the sun gear is connected to the generator 140A, the carrier is connected to the engine, and the ring gear is connected to the motor 140B. Note that a speed change mechanism may be provided between the ring gear and the motor 1408.

The HV further includes a travel battery 220 and an inverter 240. The travel battery 220 is a main power supply that stores power for driving the M/G 140. The travel battery 220 outputs direct current power. In this embodiment, the travel battery 220 is constituted by a chargeable secondary battery, for example a nickel hydrogen battery, a lithium ion battery, or the like. As noted above, the travel battery 220 is not limited to a secondary battery and may be any component capable of generating a direct current voltage. For example, the travel battery 220 may be a capacitor, a solar cell, a fuel cell, and so on.

The inverter 240 performs current control while performing conversion between the direct current power of the travel battery 220 and alternating current power of the generator 140A and the motor 140B. The inverter 240 receives direct current power from the travel battery 220 on an input side, converts the direct current power into alternating current power corresponding to a frequency command value, and outputs the alternating current power to the generator 140A and the motor 140B.

The HV further includes a battery monitoring unit 260, the engine ECU 280, an MG_ECU 300, an HV_ECU 320, and an airbag ECU 322. The battery monitoring unit 260 manages and controls charging/discharging of the travel battery 220. The engine ECU 280 controls operations of the engine 120. The MG_ECU 300 controls the M/G 140, the inverter 240, a converter 242, and so on in accordance with a condition of the HV and a state of charge of the travel battery, received from the battery monitoring unit 260.

The HV_ECU 320 controls an overall hybrid system by managing and controlling the battery monitoring unit 260, engine ECU 280, MG_ECU 300, and so on so that that the HV can travel with optimum efficiency.

The airbag ECU 322 activates an airbag (not shown) on the basis of acceleration variation during a vehicle collision or the like. An acceleration sensor 324 is connected to the airbag ECU 322. The acceleration sensor 324 detects acceleration in a front-rear direction of the vehicle, for example. Note that the acceleration sensor 324 may detect acceleration in a width direction of the vehicle or acceleration in both the front-rear direction and the width direction of the vehicle. The acceleration sensor 324 transmits a signal indicating the detected vehicle acceleration to the airbag ECU 322.

The airbag ECU 322 activates the airbag on the basis of the vehicle acceleration received from the acceleration sensor 324. The airbag ECU 322 activates the airbag when, for example, an absolute value of the vehicle acceleration is equal to or larger than a predetermined value. As well as activating the airbag, the airbag ECU 322 transmits a signal (a collision detection signal) indicating that the vehicle has collided to the HV_ECU 320.

Note that in this embodiment, the HV_ECU 320 determines that the vehicle has collided from the collision detection signal received from the airbag ECU 322, but the manner of determining a vehicle collision is not limited to this configuration. For example, a vehicle collision may be determined by transmitting the signal indicating the vehicle acceleration directly to the HV_ECU 320 from the acceleration sensor 324 and switching a collision detection flag ON or the like in the HV_ECU 320 when the absolute value of the vehicle acceleration is equal to or larger than the predetermined value.

Further, the vehicle collision determination is not limited to a determination based on the vehicle acceleration detected by the acceleration sensor 324, and instead, a vehicle collision may be determined on the basis of contact detected by a contact sensor, a distance to an object existing in a movement direction of the vehicle, detected by a millimeter wave radar, and so on. In this embodiment, the HV_ECU 320 functions as the collision detection unit.

The HV_ECU 320, having determined that the vehicle has collided, controls a relay circuit of an SMR unit 222 (functioning as the aforesaid switch unit) such that the SMR unit 222 is electrically disconnected. The SMR unit 222 is provided between the travel battery 220 and the inverter 240, and is controlled to one of a conductive condition and a disconnected condition.

In this embodiment, the converter 242 is provided between the travel battery 220 and the inverter 240. The converter 242 is used to boost a voltage of the travel battery 220 when a rated voltage of the travel battery 220 is lower than a rated voltage of the generator 140A and the motor 140B so that power is supplied to the generator 140A and the motor 140B. Note, however, that the converter 242 is not an essential component, and the invention may be applied to a vehicle not including the converter 242.

In FIG. 1, the respective ECUs are provided separately, but an integrated ECU integrating two or more ECUs may be provided instead. For example, as shown by dotted lines in FIG. 1, an integrated ECU integrating the engine ECU 280, the MG_ECU 300, and the HV_ECU 320 may be provided.

The HV_ECU 320 calculates a required driving force of the vehicle corresponding to a depression amount of an accelerator pedal. The HV_ECU 320 then controls an output or a power generation amount of the engine 120 in accordance with the required driving force corresponding to the depression amount via the generator 140A, the motor 140B, and the engine ECU 280.

The power distribution mechanism 200 uses the planetary gear mechanism to distribute the power of the engine 120 between the vehicle wheel 160 and the generator 140A. The power distribution mechanism 200 also functions as a continuously variable transmission by controlling a rotation speed of the generator 140A.

In the HV installed with the hybrid system shown in FIG. 1, when an efficiency of the engine 120 is poor, for example during startup, low speed travel, or the like, the HV travels using only the motor 140B of the M/G 140, whereas during normal travel, a transmission path of the power of the engine 120 is divided into two paths by the power distribution mechanism 200, for example. As a result, the vehicle wheel 160 is driven directly by power transmitted along one transmission path while the generator 140A is driven to generate power by power transmitted along the other transmission path. At this time, driving of the vehicle wheel 160 is assisted by driving the motor 140E using the generated power. Further, during high speed travel, the driving force applied to the vehicle wheel 160 is supplemented by supplying further power to the motor 1403 from the travel battery 220 so as to increase an output of the motor 140B.

During deceleration, on the other hand, the motor 140B driven by the vehicle wheel 160 functions as a generator (in other words, the motor 140B generates negative direction driving force) so as to perform regenerative power generation, and power collected as a result is stored in the travel battery 220. Note that when the state of charge of the travel battery 220 decreases such that charging is required, the state of charge of the travel battery 220 is increased by increasing the output of the engine 120 in order to increase the amount of power generated by the generator 140A. Control for increasing the driving force of the engine 120 may also be performed during low speed travel if necessary. Examples of such cases include a case where charging of the travel battery 220 is required, as described above, a case where an accessory device such as an air-conditioner is driven, a case where the temperature of the cooling water in the engine 120 is to be increased to a predetermined temperature, and so on.

Further, in the HV installed with the hybrid system shown in FIG. 1, depending on the operating condition of the vehicle and the condition of the travel battery 220, the engine 120 may be stopped to realize an improvement in fuel efficiency. The operating condition of the vehicle and the condition of the travel battery 220 are detected again thereafter, and if necessary, the engine 120 is restarted. In a conventional vehicle (a vehicle installed with only an engine), when an ignition switch is operated to a START position such that the engine is started, the engine does not stop until the ignition switch is operated from an ON position to an ACC position or an OFF position. The engine 120 according to this embodiment differs from that of a conventional vehicle in being operated intermittently. Note that in the HV according to this embodiment, stoppage of the engine 120 is suppressed when a vehicle speed equals or exceeds a predetermined speed V(0).

(2) Configuration of M/G Driving Apparatus to which the Invention is Applied

Figure 2:
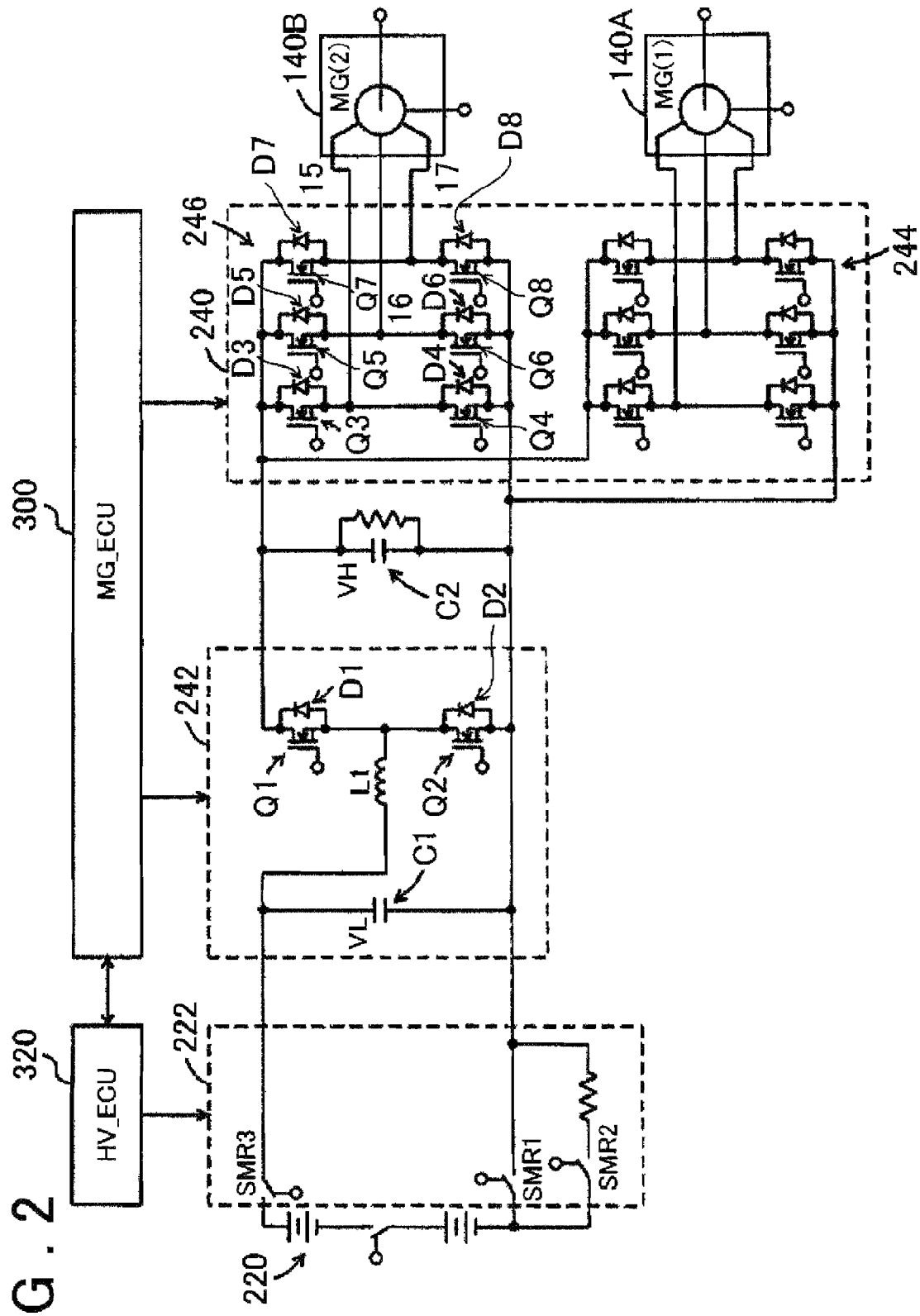
FIG. 2 is a schematic block diagram showing a configuration of a driving apparatus for an alternating current motor according to the first embodiment of the invention.

FIG. 2 is a schematic block diagram showing a configuration of a driving apparatus for an alternating current motor according to the first embodiment of the invention. As shown in FIG. 2, an M/G driving apparatus 270 includes the travel battery 220, the SMR unit 222, capacitors C1 and C2, the converter 242, the inverter 240, the generator 140A, and the motor 140B. In this embodiment, the generator 140A and the motor 140B are both three-phase alternating current permanent magnet synchronous motors having a U phase coil, a V phase coil, and a W phase coil as stator coils.

The SMR unit 222 includes an SMR 1, an SMR 2, and an SMR 3. The SMR 1, SMR 2, and SMR 3 are controlled on the basis of signals from the HV_ECU 320 to be switched from one of a conductive condition and a disconnected condition to the other. In this embodiment, when a vehicle collision is determined to have occurred during vehicle travel (i.e. when the SMR 1, SMR 2, and SMR 3 are all in the conductive condition), the SMR 1, SMR 2, and SMR 3 are controlled on the basis of a signal from the HV_ECU 320 so as to be switched from the conductive condition to the disconnected condition.

The capacitor C1, which functions as the storage unit, smooths the direct current voltage supplied from the travel battery 220 and outputs the smoothed direct current voltage to the converter 242.

The converter 242 boosts the direct current voltage supplied from the capacitor C1, and supplies the boosted direct current voltage to the capacitor C2. The converter 242 includes a reactor L1, IGBT elements Q1 and Q2, and diodes D1 and D2.

One end of the reactor L1 is connected to a power supply line of the travel battery 220, and another end is connected to an intermediate point between the IGBT element Q1 and the IGBT element Q2, or in other words between an emitter of the IGBT element Q1 and a collector of the IGBT element Q2. The IGBT elements Q1 and Q2 are connected to each other in series between the power supply line and an earth line. A collector of the IGBT element Q1 is connected to the power supply line, and an emitter of the IGBT element Q2 is connected to the earth line. Further, the diodes D1 and D2 are connected between the respective collectors and emitters of the IGBT elements Q1 and Q2 to pass a current from the emitter side to the collector side.

The capacitor C2, which functions as the storage unit, is connected to an input side (an input stage) of the inverter 240. The capacitor C2 smooths the direct current voltage from the converter 242 and supplies the smoothed direct current voltage to the inverter 240. The inverter 240 converts the direct current voltage supplied from the capacitor C2 into a three-phase alternating current voltage, and outputs the three-phase alternating current voltage to the generator 140A or the motor 140B. The inverter 240 includes a generator inverter 244 and a motor inverter 246.

The motor inverter 246 converts the output voltage from the converter 242 into a three-phase alternating current voltage, and outputs the three-phase alternating current voltage to the motor 140B. Further, during regenerative braking, the motor inverter 246 outputs the power generated in the motor 140B to the converter 242. At this time, the converter 242 is controlled by the HV_ECU 320 to operate as a step-down circuit. Note that the converter 242 is not an essential component, and the invention may be applied to a vehicle not including the converter 242.

The motor inverter 246 includes a U phase arm 15, a V phase arm 16, and a W phase arm 17. The U phase arm 15, the V phase arm 16, and the W phase arm 17 are connected in parallel between output lines of the converter 242.

The U phase aim 15 is constituted by TORT elements Q3 and Q4 connected to each other in series, the V phase arm 16 is constituted by IGBT elements Q5 and Q6 connected to each other in series, and the W phase arm 17 is constituted by IGBT elements Q7 and Q8 connected to each other in series. Further, diodes D3 to D8 are connected between respective collectors and emitters of the IGBT elements Q3 to Q8 to pass a current from the emitter side to the collector side.

Intermediate points of the respective phase arms are connected to respective phase ends of the respective phase coils of the motor 140B. In other words, the motor 140E is a three-phase alternating current synchronous motor in which one end of each of the three coils, namely the U phase coil, the V phase coil, and the W phase coil, is connected to a midpoint. The other end of the U phase coil is connected to an intermediate point between the IGBT elements Q3 and Q4, the other end of the V phase coil is connected to an intermediate point between the IGBT elements Q5 and Q6, and the other end of the W phase coil is connected to an intermediate point between the TORT elements Q7 and Q8.

The HV_ECU 320 outputs one of a boosting instruction and a step-down instruction to the converter 242 via the MG_ECU 300 on the basis of a torque command value relating to the motor 14013, the motor rotation speed, the direct current voltage of the travel battery 220, the output voltage of the converter 242, and respective motor currents of the U phase arm 15, the V phase arm 16, and the W phase arm 17. In the following description, the control performed by the HV_ECU 320 on the inverter 240 and the converter 242 is described as being performed via the MG_ECU 300, but control of the inverter 240 and the converter 242 may be performed by the MG_ECU 300 instead of the HV_ECU 320 or by an integrated ECU integrating the HV_ECU 320 and the MG_ECU 300.

The HV_ECU 320 outputs one of a signal indicating a driving instruction and a signal indicating a regeneration instruction to the motor inverter 246. The driving instruction is an instruction to convert the direct current voltage output by the converter 242 into an alternating current voltage for driving the motor 140B, while the regeneration instruction is an instruction to convert the alternating current voltage generated by the motor 140B into a direct current voltage and output the direct current voltage to the converter 242.

The HV_ECU 320 reads a carrier frequency map used to set a carrier frequency of a carrier signal from a Read Only Memory (ROM), not shown in the drawings, and uses the read carrier frequency map to set the carrier frequency of the carrier signal. On the carrier frequency map, carrier frequencies corresponding to torques and rotation speeds of the motor 140B are mapped as data. The HV_ECU 320 uses the carrier frequency map to set a carrier frequency based on the torque command value and the motor rotation speed of the motor 140B. On the basis of the set carrier frequency, the HV_ECU 320 generates signals for switching the respective IGBT elements Q3 to Q8 of the motor inverter 246 ON or OFF (switching control), and outputs the generated signals to the respective IGBT elements Q3 to Q8 of the motor inverter 246.

As a result, the respective IGBT elements Q3 to Q8 are subjected to switching control, whereby the currents flowing to the respective phase coils of the motor 140B are controlled such that the motor 140B outputs torque corresponding to the torque command value. Thus, a motor drive current is controlled such that motor torque corresponding to the torque command value is output.

In this embodiment, the MG_ECU 300 calculates the exciting current command Id* and the torque current command Iq* on the basis of the torque command value, and generates a PWM signal, for example, on the basis of the calculated exciting current command Id* and torque current command Iq*. The MG_ECU 300 then controls the currents flowing from the motor inverter 246 to the respective phase coils of the motor 140B on the basis of the generated PWM signal such that the motor 140B is caused to output motor torque corresponding to the torque command value.

As described above, the motor 140B (and the generator 140A) is a three-phase alternating current permanent magnet synchronous motor including a U phase coil, a V phase coil, and a W phase coil as stator coils. Therefore, in the MG_ECU 300, a d-p/3 phase conversion unit (not shown) converts the exciting current command Id* and the torque current command Iq* corresponding to the torque command value into respective phase current commands Iu*, Iv*, Iw*. The currents flowing from the motor inverter 246 to the respective phase coils of the motor 140B are then controlled on the basis of the respective phase current commands. Further, currents Iu, Iv, Iw flowing to the respective phase coils of the motor 1408 are converted into the exciting current component Id and the torque current component Iq by a 3 phase/d-p conversion unit (not shown) provided in the MG_ECU 300. The 3 phase/d-p conversion unit then calculates a difference between the exciting current command Id* and torque current command Iq* and the exciting current component Id and torque current component Iq of the current detected in the motor 140B.

The generator inverter 244 converts the output voltage of the converter 242 into a three-phase alternating current voltage and outputs the three-phase alternating current voltage to the generator 140A. Further, the generator inverter 244 outputs the power generated by the generator 140A to the converter 242. Note that the configuration of and the control performed by the generator inverter 244 are similar to the configuration of and the control performed by the motor inverter 246, and therefore detailed description thereof will not be repeated.

In the HV configured as described above, when a vehicle collision is detected by the HV_ECU 320, the electric connection between the travel battery 220 and the inverter 240 is disconnected by the SMR unit 222 such that the supply of direct current power from the travel battery 220 to the inverter 240 is stopped.

When the rotation speed of one of the generator 140A and the motor 140B is higher than the predetermined allowable rotation speed Ra or one of terminal voltages VL and VH of the capacitors C1 and C2 is higher than allowable terminal voltages VLa and VHa respectively determined in advance in relation thereto, the MG_ECU 300 sets the exciting current command value Id* of the motor drive current supplied to either the generator 140A or the motor 140E at the predetermined exciting current discharge value Idd other than zero and sets the torque current command value Iq* at zero. As a result, the power stored in the capacitors C1 and C2 and/or the counter-electromotive power generated by the rotation of the generator 140A and the motor 140B are consumed by either the generator 140A or the motor 140B.

When, on the other hand, the rotation speed of both the generator 140A and the motor 140E is equal to or lower than the allowable rotation speed Ra and both of the terminal voltages VL and VH of the capacitors C1 and C2 are equal to or lower than the allowable terminal voltages VLa and VHa, the MG_ECU 300 sets both the exciting current command value Id* and the torque current command value Iq* of the motor drive current supplied to both the generator 140A and the motor 140B at zero. The reason for this is that there is no need to consume the power stored in the capacitors C1 and C2 and/or the counter-electromotive power generated by the rotation of the generator 140A and the motor 140B.

It is assumed in the above description that the power stored in the capacitors C1 and C2 and/or the counter-electromotive power generated by the rotation of the generator 140A and the motor 140B are consumed by either the generator 140A or the motor 140B. However, the stored power and the counter-electromotive power may be consumed by both the generator 140A and the motor 140B. Further, when the vehicle is provided with a rear motor, the power may be consumed by at least one of the generator 140A, the motor 140B, and the rear motor.

Note that when the invention is applied to a vehicle that does not include the converter 242, the terminal voltage VL of the capacitor C1 of the above description need not be taken into account.

Further, in this embodiment, after a vehicle collision has been detected and all of the SMR 1, the SMR 2, and the SMR 3 have been controlled from the conductive condition to the disconnected condition, the HV_ECU 320 may continue to control the motor inverter 246 and/or 244 until the respective voltages (the terminal voltages VL and VH) of the capacitors C1 and C2 have fallen to or below the predetermined values thereof (the allowable terminal voltages VLa and VHa), or continue to control the motor inverter 246 and/or 244 until a predetermined time has elapsed. The predetermined time may be a time required for at least the respective voltages (the terminal voltages VL and VH) of the capacitors C1 and C2 to fall to values at a level where operational difficulty such as that described above does not occur, and may be determined in advance by an experiment or the like, for example.

Next, execution procedures of a vehicle control method according to the invention will be described with comparison to a vehicle control method according to the related art. The vehicle control method according to the invention may be executed in the vehicle control apparatus according to the first embodiment described above, for example. Note that to facilitate understanding of the invention, a configuration including only one alternating current motor will be described below, but the vehicle to which the control apparatus or the control method according to the invention is applied may be any vehicle installed with one or more alternating current motors as a drive source. In other words, the vehicle may be a front wheel drive vehicle including two alternating current motors or a four wheel drive vehicle including three or more alternating current motors. The vehicle may also be a two-wheeled automobile including one or more alternating current motors.

(3) Vehicle Control Method According to the Related Art

Figure 3:
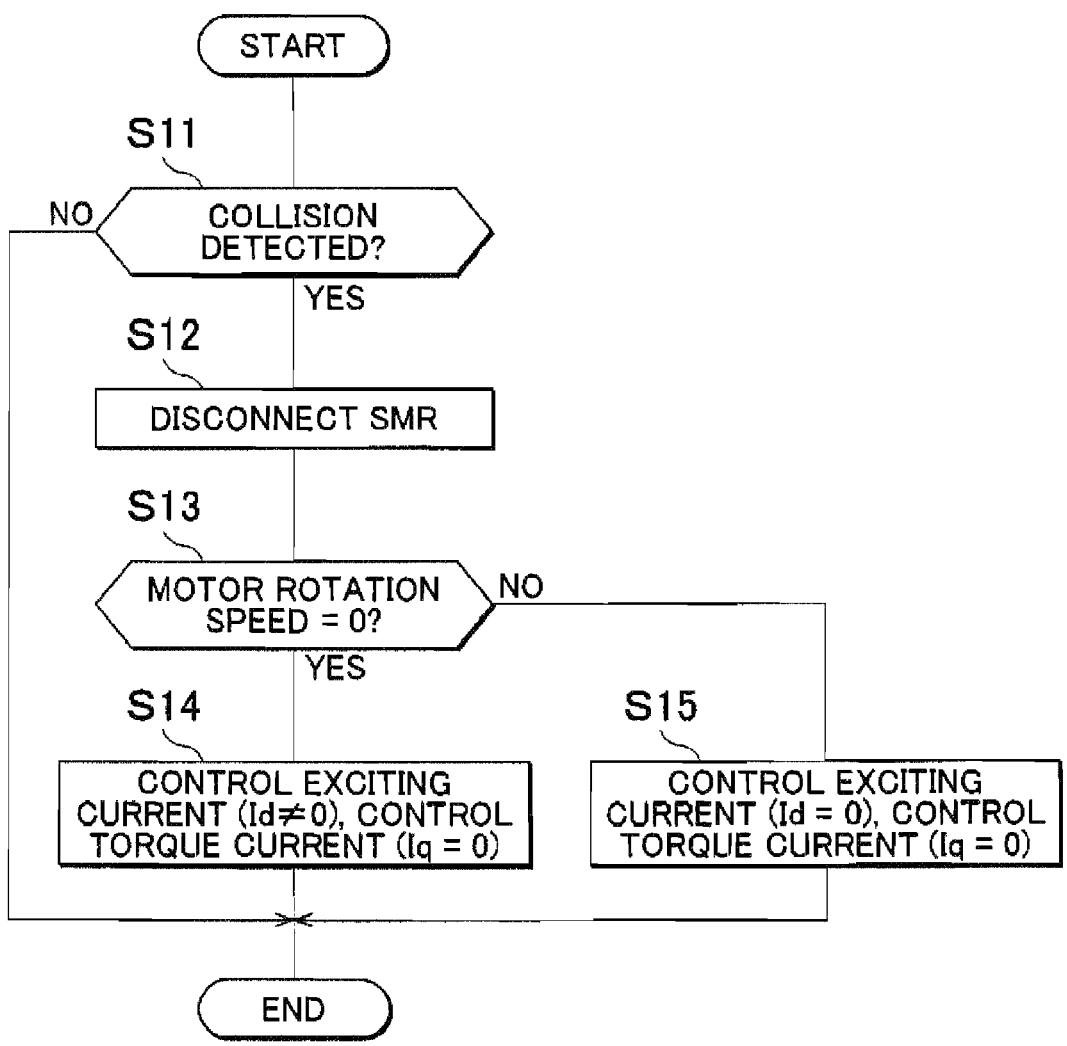
FIG. 3 is a flowchart illustrating a flow of procedures executed in a vehicle control method according to the related art.

FIG. 3 is a flowchart illustrating a processing flow executed in the vehicle control method according to the related art. As shown in FIG. 3, in the vehicle control method according to the related art, first, in Step S11, a determination is made as to whether or not a vehicle collision has been detected. When it is determined in Step S11 that a vehicle collision has been detected (S11, YES), the electric connection between the power supply and the inverter is disconnected by the switch unit (SMR) in Step S12. Next, in Step S13, a determination is made as to whether or not the alternating current motor has stopped rotating (rotation speed=0). When it is determined in Step S13 that the alternating current motor has stopped rotating (S13, YES), the exciting current command value Id* of the alternating current supplied to the alternating current motor is set at a value other than zero and the torque current command value Iq* is set at zero in S14. As a result, the power stored in the storage unit is consumed by the alternating current motor while suppressing unintentional torque generation in the alternating current motor.

When it is determined in Step S13 that the alternating current motor is still rotating (rotation speed≠0), on the other hand (S13, NO), the exciting current command value Id* and the torque current command value Iq* are both set at zero in Step S15. Hence, in the vehicle control method according to the related art, when the alternating current motor has not stopped rotating at the time of a vehicle collision, the power stored in the storage unit is not consumed, and therefore a charge remains stored in the storage unit. In other words, when the alternating current motor has not stopped rotating at the time of the vehicle collision, the charge stored in the storage unit cannot be discharged quickly.

Figure 4:
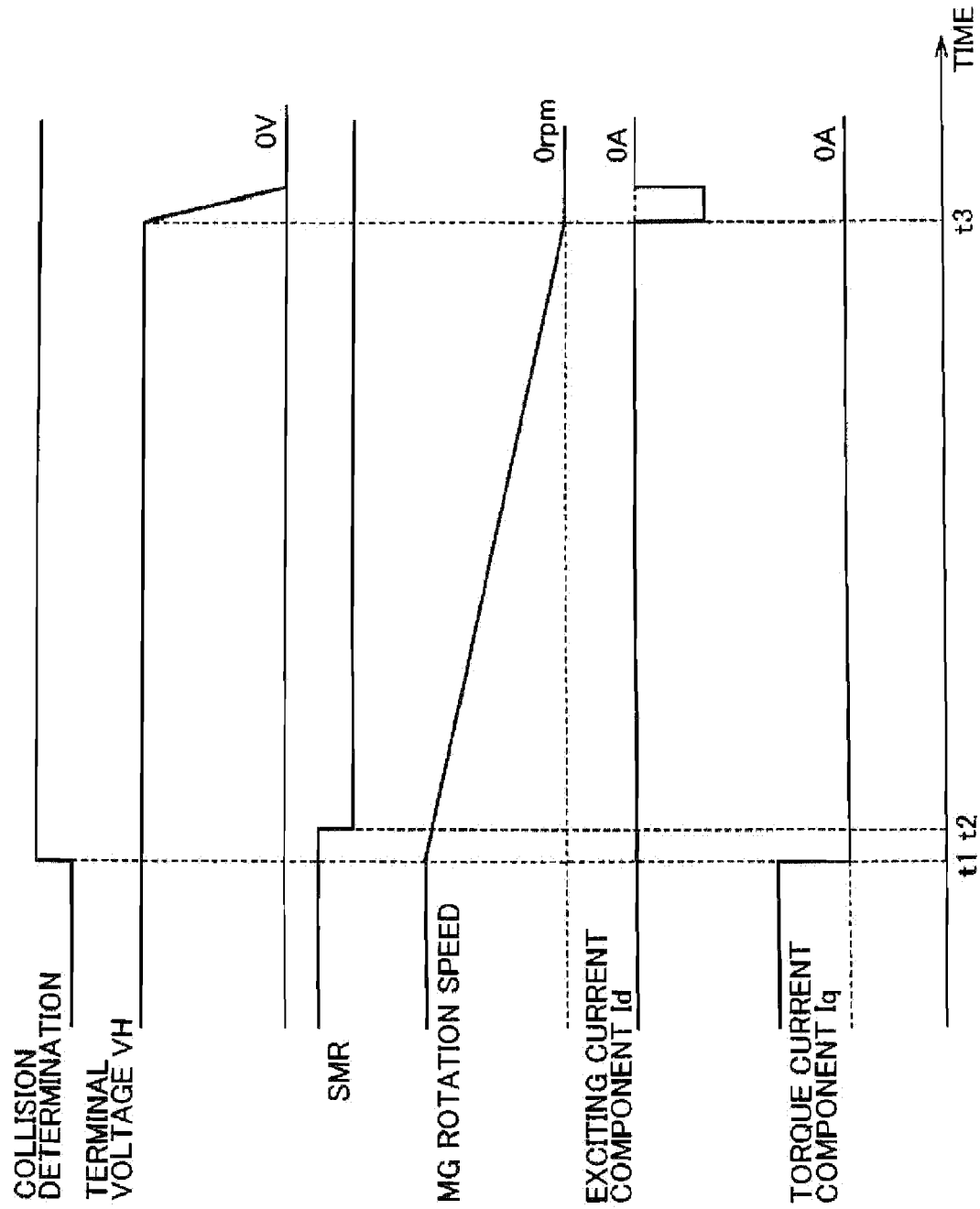
FIG. 4 is a schematic time chart showing temporal variation in statuses and values of various determination items and control items during implementation of the vehicle control method shown in FIG. 3.

FIG. 4 is a schematic time chart showing temporal variation in statuses and values of various determination items and control items during implementation of the vehicle control method shown in FIG. 3. As shown in FIG. 4, in the vehicle control method according to the related art, when a vehicle collision is detected at a time t1, the electric connection between the power supply and the inverter is disconnected by the switch unit (SMR) at a time t2. At the time t2, a charge is stored in the storage unit and the terminal voltage VH of the storage unit indicates a high value.

Further, in FIG. 4, the alternating current motor (MG) is still rotating (rotation speed≠0) at the time t2. Hence, at the time t2, the exciting current command value Id* and the torque current command value Iq* are both set at zero. Therefore, while the alternating current motor (MG) continues to rotate, the power stored in the storage unit is not consumed, and as a result, the terminal voltage VH of the storage unit is held at a high value.

When the rotation speed of the alternating current motor (MG) subsequently decreases gradually such that the alternating current motor (MG) stops (rotation speed=0) at a time t3, the exciting current command value Id* is set at a value other than zero and the torque current command value Iq* is set at zero. Accordingly, the power stored in the storage unit is consumed by the alternating current motor (MG) while suppressing unintentional torque generation in the alternating current motor (MG). As a result, the terminal voltage VH of the storage unit decreases.

As described above, in the vehicle control method according to the related art, discharging of the charge stored in the storage unit starts only when the alternating current motor (MG) has stopped rotating. In other words, when the alternating current motor (MG) has not yet stopped rotating at the time of the vehicle collision, the charge stored in the storage unit cannot be discharged quickly.

With the vehicle control method according to the invention, on the other hand, in a case where a vehicle installed with an alternating current motor as a drive source collides, the charge stored in the storage unit provided in the inverter that supplies an alternating current to the alternating current motor can be discharged quickly while suppressing unintentional torque generation in the alternating current motor, even when the alternating current motor continues to rotate as the tires spin and so on. The vehicle control method according to the invention will be described in detail below with reference to the drawings.

(4) Vehicle Control Method According to Second Embodiment of the Invention

Figure 5:
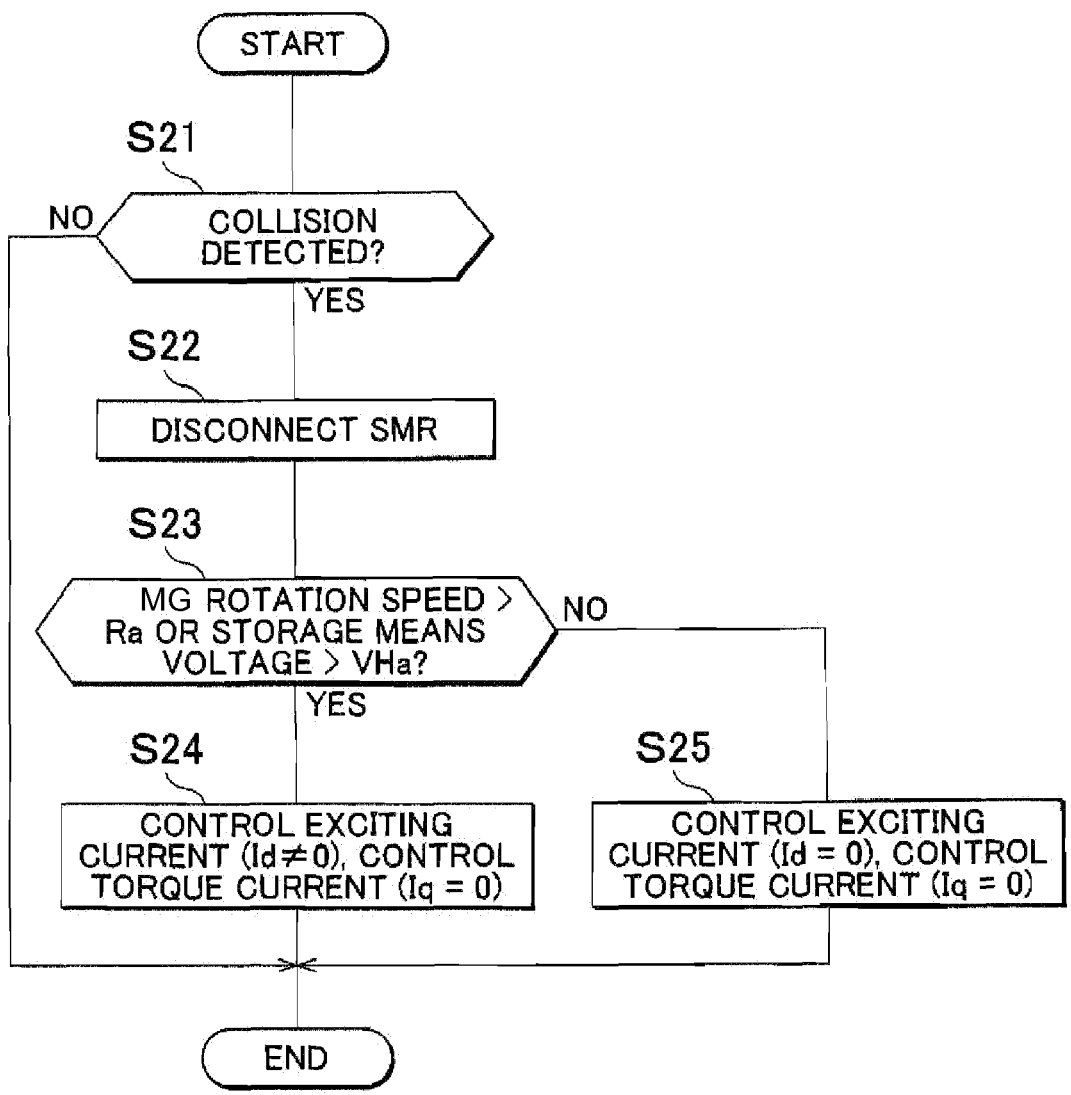
FIG. 5 is a flowchart illustrating a flow of procedures executed in the vehicle control method according to the second embodiment of the invention.

FIG. 5 is a flowchart illustrating a processing flow executed in a vehicle control method according to a second embodiment of the invention. As shown in FIG. 5, in the vehicle control method according to this embodiment, first, in Step S21, a determination is made as to whether or not a vehicle collision has been detected. When it is determined in Step S21 that a vehicle collision has been detected, the electric connection between the power supply and the inverter is disconnected by the switch unit (SMR) in Step S22. Next, in Step S23, a determination is made as to whether or not the rotation speed of the alternating current motor is sufficiently high (rotation speed>allowable rotation speed Ra) to have a substantial effect such as causing the storage unit to be charged by the counter-electromotive voltage generated by the rotation of the alternating current motor or whether or not the terminal voltage VH of the storage unit is sufficiently high (terminal voltage VH>allowable terminal voltage VHa) to envisage a situation in which operations performed on the inverter or the motor for the purpose of maintenance, inspection, repair, and so on become difficult. When it is determined in Step S23 that the rotation speed of the alternating current motor is higher than the allowable rotation speed Ra or that the terminal voltage VH of the storage unit is higher than the allowable terminal voltage VHa (S23, YES), the exciting current command value Id* of the alternating current supplied to the alternating current motor is set at the exciting current discharge value Idd determined in advance at a value other than zero while the torque current command value Iq* is set at zero. In so doing, the counter-electromotive power generated by the rotation of the alternating current motor and the power stored in the storage unit are consumed by the alternating current motor while suppressing unintentional torque generation in the alternating current motor.

When, on the other hand, it is determined in Step S23 that the rotation speed of the alternating current motor is equal to or lower than the allowable rotation speed Ra (rotation speed≤allowable rotation speed Ra) and that the terminal voltage VH of the storage unit is equal to or lower than the allowable terminal voltage VHa (terminal voltage VH≤allowable terminal voltage VHa) (S23, NO), there is no need to discharge the counter-electromotive power generated by the rotation of the alternating current motor and the power stored in the storage unit. Therefore, in Step S25, the exciting current command value Id* and the torque current command value Iq* are both set at zero.

Hence, in the vehicle control method according to this embodiment, the counter-electromotive power generated by the rotation of the alternating current motor and the power stored in the storage unit are discharged even when the alternating current motor continues to rotate at the time of the vehicle collision. Accordingly, in contrast to the vehicle control method according to the related art described above, there is no need to wait for the alternating current motor to stop rotating in order to discharge the power stored in the storage unit. With the vehicle control method according to this embodiment, therefore, the charge stored in the storage unit can be discharged more quickly than with the vehicle control method according to the related art.

Figure 6:
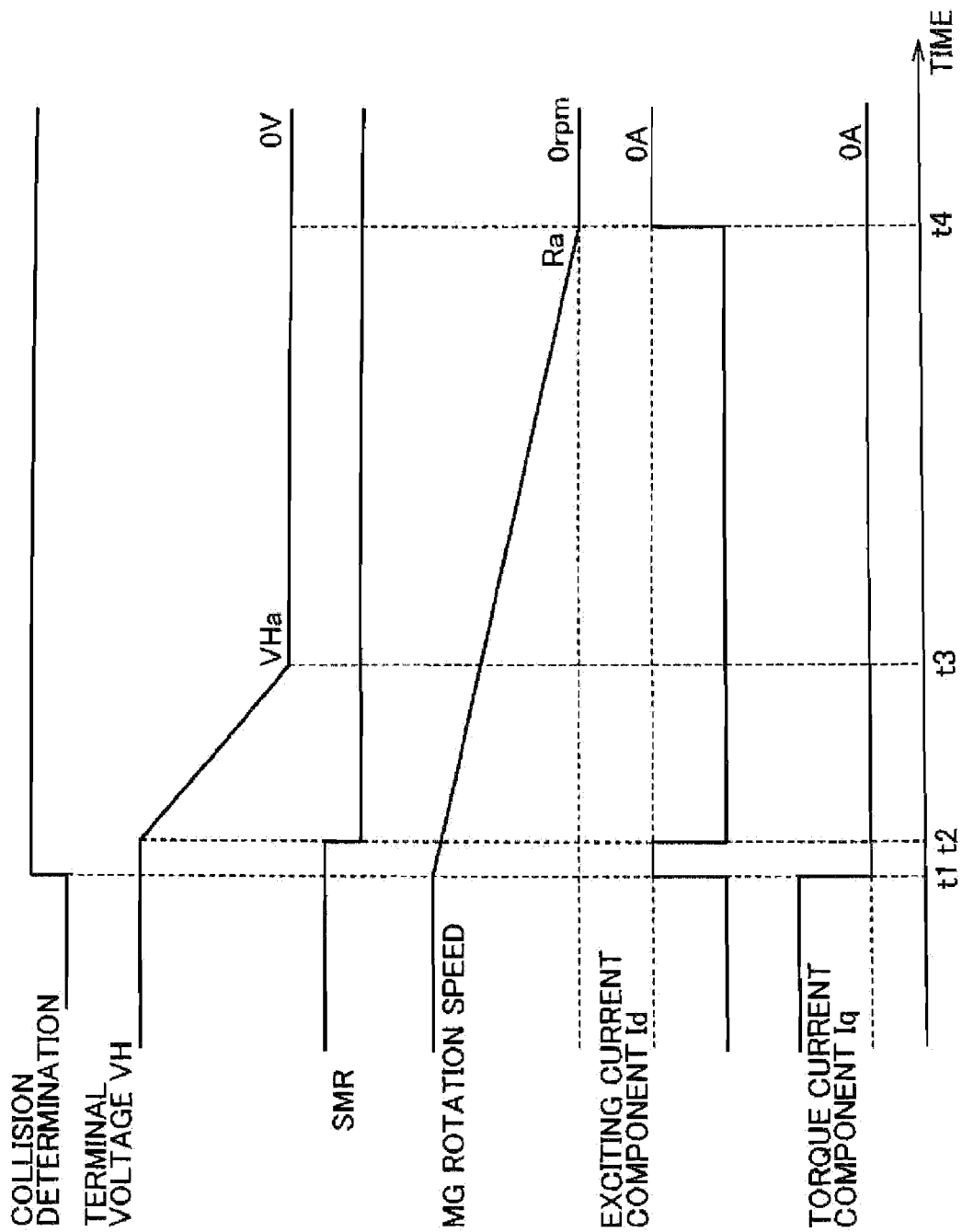
FIG. 6 is a schematic time chart showing temporal variation in statuses and values of various determination items and control items during implementation of the vehicle control method shown in FIG. 5.

FIG. 6 is a schematic time chart showing temporal variation in statuses and values of various determination items and control items during implementation of the vehicle control method shown in FIG. 5. As shown in FIG. 6, in the vehicle control method according to this embodiment, when a vehicle collision is detected at the time t1, the electric connection between the power supply and the inverter is disconnected by the switch unit (SMR) at the time t2. At the time t2, a charge is stored in the storage unit and the terminal voltage VH of the storage unit indicates a high value (terminal voltage VH>allowable terminal voltage VHa). Further, at the time t2, the alternating current motor (MG) is still rotating (rotation speed>allowable rotation speed Ra).

When the terminal voltage VH of the storage unit is high (terminal voltage VH>allowable terminal voltage VHa) or the alternating current motor (MG) is still rotating (rotation speed>allowable rotation speed Ra) at the time t2, the exciting current command value Id* is set at the exciting current discharge value Idd and the torque current command value Iq* is set at zero. As a result, the counter-electromotive power generated by the rotation of the alternating current motor (MG) and the power stored in the storage unit are consumed rapidly in the alternating current motor (MG) while suppressing unintentional torque generation in the alternating current motor (MG). When the terminal voltage VH of the storage unit falls to or below the allowable terminal voltage VHa at the time t3 and the rotation speed of the alternating current motor falls to or below the allowable rotation speed Ra thereafter at a time t4, the exciting current command value Id* and the torque current command value Iq* are both set at zero.

As described above, with the vehicle control method according to the related art, when the alternating current motor continues to rotate at the time of the vehicle collision, discharging of the power stored in the storage unit starts only after the alternating current motor has stopped rotating. In the vehicle control method according to this embodiment, on the other hand, discharging of the counter-electromotive power generated by the rotation of the alternating current motor and the power stored in the storage unit starts immediately even when the alternating current motor continues to rotate, i.e. without waiting for the alternating current motor to stop rotating (or for the rotation speed of the alternating current motor to decrease). Hence, with the vehicle control method according to this embodiment, the charge stored in the storage unit can be discharged more quickly than with the vehicle control method according to the related art.

(5) Vehicle Control Method According to Third Embodiment of the Invention

Figure 7:
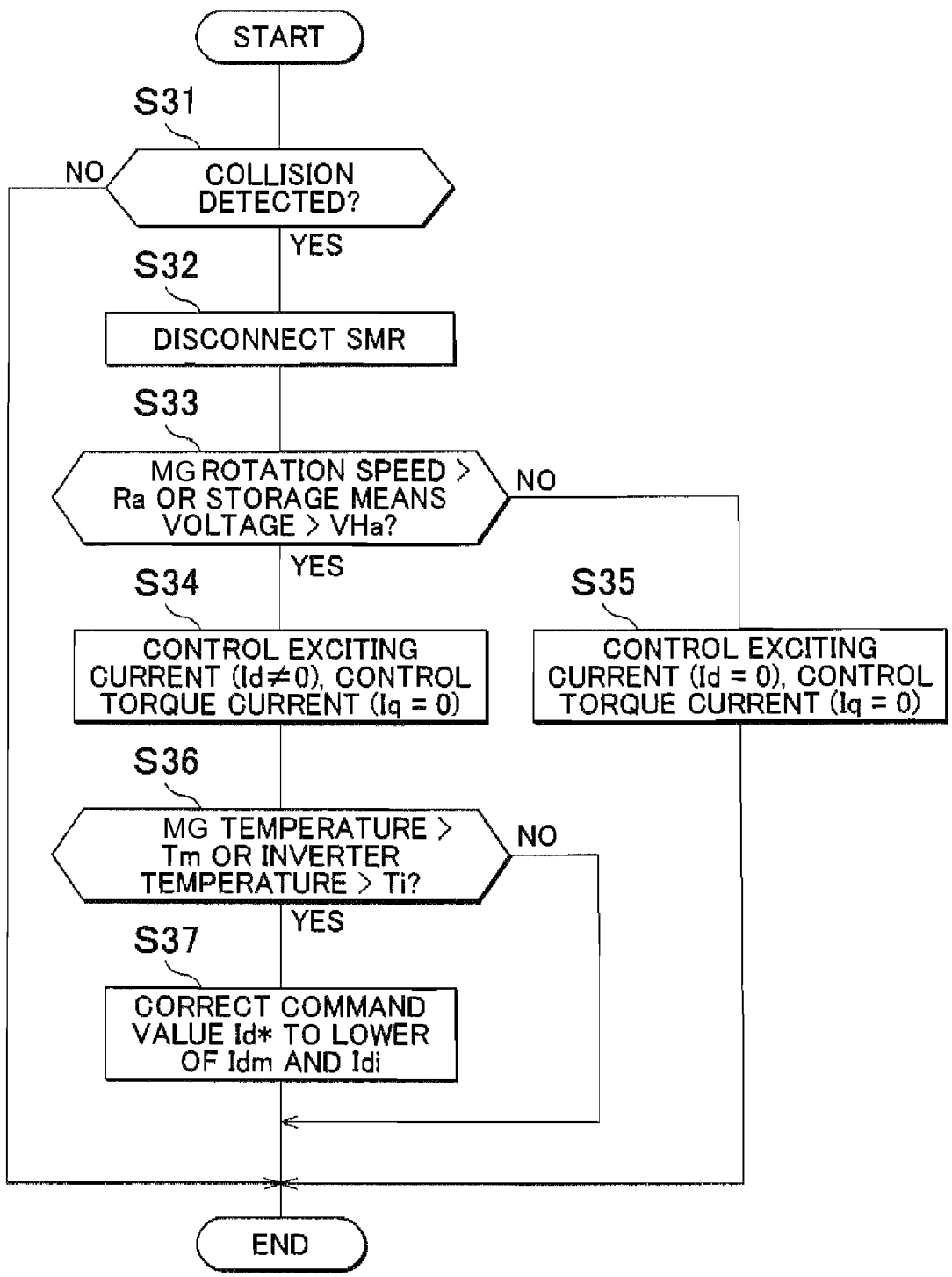
FIG. 7 is a flowchart illustrating a flow of procedures executed in a vehicle control method according to a third embodiment of the invention.

FIG. 7 is a flowchart illustrating a processing flow executed in a vehicle control method according to a third embodiment of the invention. As shown in FIG. 7, in the vehicle control method according to this embodiment, when it is determined in Step S31 that a vehicle collision has been detected (S31, YES), the electric connection between the power supply and the inverter is disconnected by the switch unit (SMR) in Step S32. Next, in Step S33, a determination is made as to whether or not the rotation speed of the alternating current motor is sufficiently high (rotation speed>allowable rotation speed Ra) to have a substantial effect such as causing the storage unit to be charged by the counter-electromotive voltage generated by the rotation of the alternating current motor, for example, or whether or not the terminal voltage VH of the storage unit is sufficiently (terminal voltage VH>allowable terminal voltage VHa) to envisage a situation in which operations performed on the inverter or the motor for the purpose of maintenance, inspection, repair, and so on, for example, become difficult. When it is determined in Step S33 that the rotation speed of the alternating current motor is higher than the allowable rotation speed Ra or that the terminal voltage VH of the storage unit is higher than the allowable terminal voltage VHa (S33, YES), the exciting current command value Id* of the alternating current supplied to the alternating current motor is set at the exciting current discharge value Idd determined in advance at a value other than zero while the torque current command value Iq* is set at zero in Step S34. In so doing, the counter-electromotive power generated by the rotation of the alternating current motor and the power stored in the storage unit are consumed in the alternating current motor while suppressing unintentional torque generation in the alternating current motor.

The processing flow described above is identical to that of the vehicle control method according to the second embodiment. Further, when the rotation speed of the alternating current motor is higher than the allowable rotation speed Ra or the terminal voltage VH of the storage unit is higher than the allowable terminal voltage VHa in the vehicle control method according to either the second embodiment or this embodiment, the exciting current command value Id* is preferably set at as high a value as possible to ensure that the charge stored in the storage unit is discharged quickly. However, when the exciting current command value Id* is set at a high value, the inverter and the alternating current motor may overheat, and as a result, the inverter, the alternating current motor, or another device or the like disposed on the periphery thereof, for example, may be damaged and so on. Therefore, the exciting current command value Id* is preferably set appropriately to ensure that the inverter and the alternating current motor do not overheat.

Hence, in the vehicle control method according to this embodiment, a determination is made in Step S36 as to whether or not the temperature of the inverter is higher than the predetermined inverter upper limit temperature Ti or whether or not the temperature of the alternating current motor is higher than the predetermined motor upper limit temperature Tm. When it is determined in Step S36 that the temperature of the inverter is higher than the upper limit temperature Ti or that the temperature of the motor is higher than the motor upper limit temperature Tm (S36, YES), the exciting current command value Id* is corrected in Step S37 to a value equal to or lower than one of the exciting current upper limit value Idi determined in advance in accordance with the temperature of the inverter and the exciting current upper limit value Idm determined in advance in accordance with the temperature of the alternating current motor, which is lower than the other of the exciting current upper limit value Idi and the exciting current upper limit value Idm.

A correspondence relationship between the temperature of the inverter and the exciting current upper limit value Idi and a correspondence relationship between the temperature of the alternating current motor and the exciting current upper limit value Idm may be determined respectively in advance in the form of a function or a data map such as a data table, for example. In so doing, when the temperature of the inverter, detected by a temperature detection unit such as a temperature sensor, for example, is higher than the inverter upper limit temperature Ti or the temperature of the alternating current motor is higher than the motor upper limit temperature Tm, the exciting current upper limit value Idi and the exciting current upper limit value Idm corresponding to the respective temperatures of the inverter and the alternating current motor can be specified by performing a calculation using the function or referring to the data map, for example.

Figure 8A:
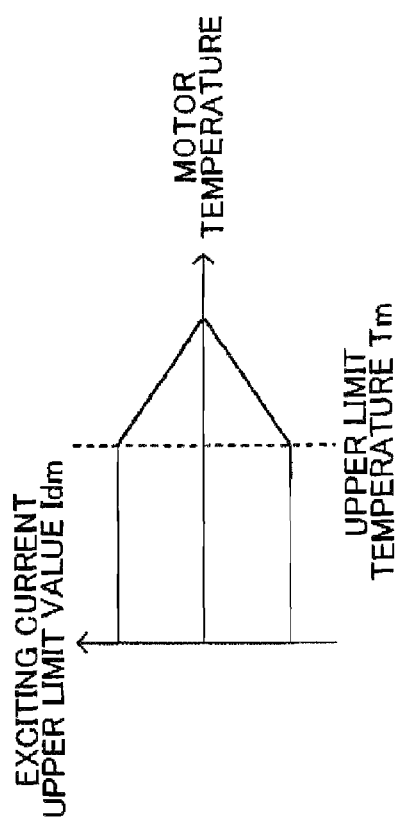
FIGS. 8A and 8B are schematic graphs illustrating examples of a correspondence relationship between an inverter temperature and an exciting current upper limit value Idi and a correspondence relationship between an alternating current motor temperature and an exciting current upper limit value Idm, which are used in the vehicle control method shown in FIG. 7.
Figure 8B:
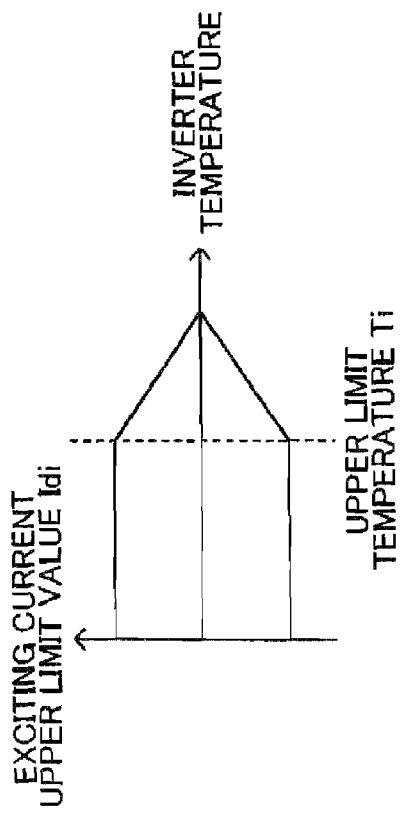

FIGS. 8A and 8B are schematic graphs illustrating examples of the correspondence relationship (FIG. 8A) between the inverter temperature and the exciting current upper limit value Idi and the correspondence relationship (FIG. 8B) between the alternating current motor temperature and the exciting current upper limit value Idm, which are used in the vehicle control method shown in FIG. 7. As shown in FIG. 8A, the exciting current upper limit value Idi is set such that an absolute value thereof gradually decreases as the inverter temperature rises beyond the inverter upper limit temperature Ti. Similarly, as shown in FIG. 8A, the exciting current upper limit value Idm is set such that an absolute value thereof gradually decreases as the alternating current motor temperature rises beyond the motor upper limit temperature Tm. Note that in FIG. 8A, the abscissa represents the temperature of the inverter while the ordinate represents the exciting current upper limit value Idi. Further, in FIG. 8B, the abscissa represents the temperature of the alternating current motor while the ordinate represents the exciting current upper limit value Idm. A flow direction of the exciting current component Id (and the torque current component Iq) reverses in accordance with a rotation direction of the alternating current motor, and therefore the graphs in FIGS. 8A and 8B respectively show the exciting current upper limit values Idi and Idm in both positive and negative directions.

In the vehicle control method according to this embodiment, the ECU 300 (described above, for example) installed in the vehicle, for example, specifies one of the exciting current upper limit value Idi and the exciting current upper limit value Idm, which is lower than the other of the exciting current upper limit value Idi and the exciting current upper limit value Idm, on the basis of the exciting current upper limit value Idi and the exciting current upper limit value Idm specified as described above, and corrects the exciting current command value Id* to a value equal to or lower than the specified exciting current value. Hence, in the vehicle control method according to this embodiment, the temperature of the inverter and the temperature of the alternating current motor are maintained at or below the inverter upper limit temperature Ti and the motor upper limit temperature Tm, respectively, such that overheating of the inverter and the alternating current motor is suppressed. As a result, damage and so on to the inverter, the alternating current motor, and other devices and the like disposed on the periphery thereof, for example, is suppressed.

When, on the other hand, it is determined in Step S33 that the rotation speed of the alternating current motor is equal to or lower than the allowable rotation speed Ra (rotation speed≤allowable rotation speed Ra) and that the terminal voltage VH of the storage unit is equal to or lower than the allowable terminal voltage VHa (terminal voltage VH≤allowable terminal voltage VHa) (S33, NO), there is no need to consume the counter-electromotive power generated by the rotation of the alternating current motor and the power stored in the storage unit, similarly to the vehicle control method according to the second embodiment. Therefore, in Step S35, the exciting current command value Id* and the torque current command value Iq* are both set at zero.

Hence, in the vehicle control method according to this embodiment, the counter-electromotive power generated by the rotation of the alternating current motor and the power stored in the storage unit are discharged even when the alternating current motor continues to rotate at the time of the vehicle collision. Accordingly, in contrast to the vehicle control method according to the related art described above, there is no need to wait for the alternating current motor to stop rotating in order to discharge the power stored in the storage unit. In addition, with the vehicle control method according to this embodiment, when the temperature of the inverter or the alternating current motor is higher than the corresponding predetermined upper limit temperature, the exciting current command value Id* of the alternating current supplied to the alternating current motor from the inverter is corrected to a value at or below one of the exciting current upper limit values Idi and Idm which are determined in advance with respect to the inverter and the alternating current motor, respectively, which is lower than the other of the exciting current upper limit values Idi and Idm. With the vehicle control method according to this embodiment, therefore, overheating of the inverter and the alternating current motor can be suppressed. Hence, with the vehicle control method according to this embodiment, the charge stored in the storage unit can be discharged more quickly and more safely than with the vehicle control method according to the related art.

Figure 9:
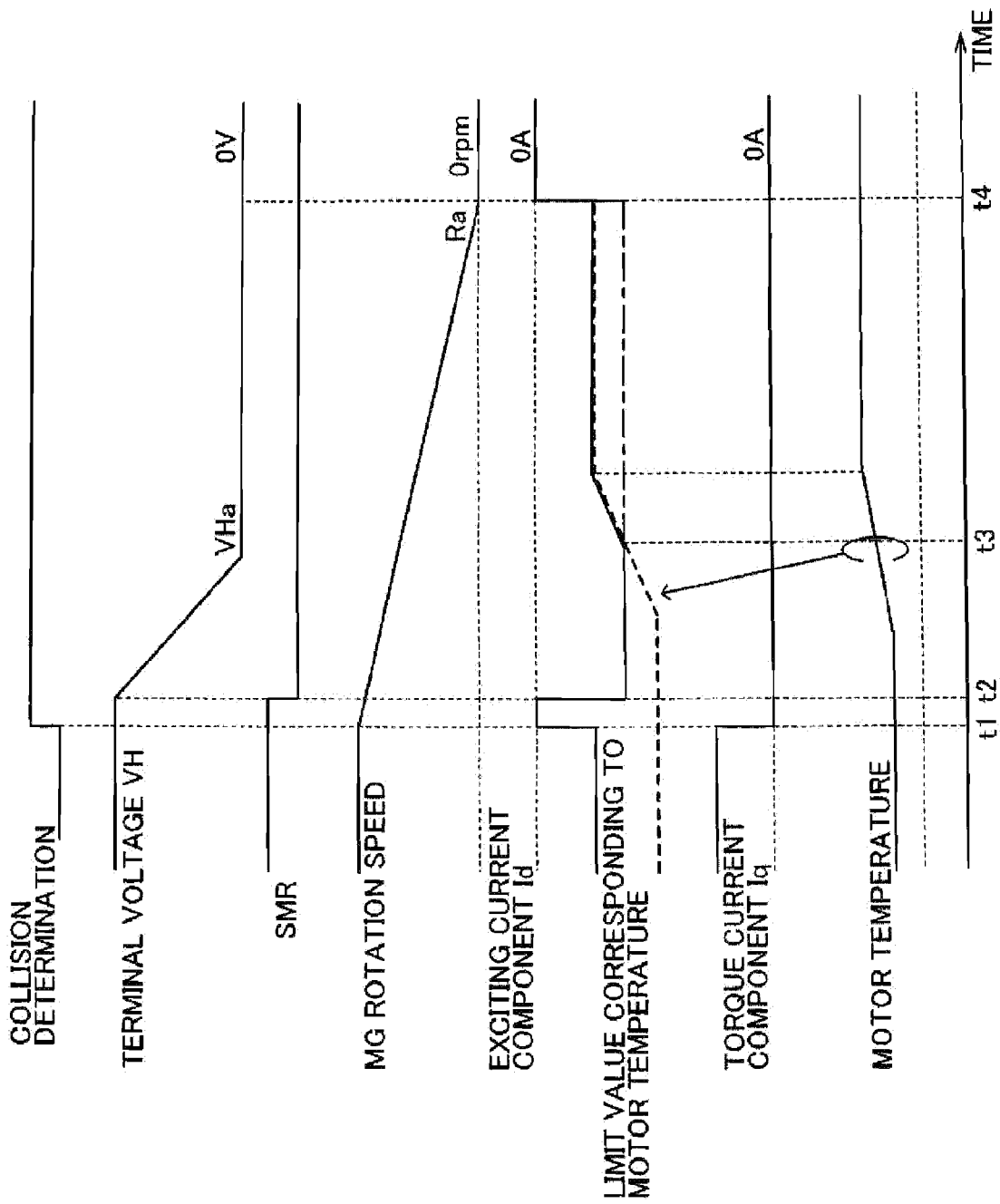
FIG. 9 is a schematic time chart showing temporal variation in statuses and values of various determination items and control items during implementation of the vehicle control method shown in FIG. 7.

FIG. 9 is a schematic time chart showing temporal variation in statuses and values of various determination items and control items during implementation of the vehicle control method shown in FIG. 7. Note that although the flowchart in FIG. 7 illustrates correction processing performed on the exciting current command value Id* taking into consideration the temperatures of both the inverter and the alternating current motor, for the purpose of simplification, the time chart in FIG. 9 illustrates correction processing performed on the exciting current command value Id* on the basis of only the temperature of the alternating current motor (the motor).

As shown in FIG. 9, in the vehicle control method according to this embodiment, when a vehicle collision is detected at the time t1, the electric connection between the power supply and the inverter is disconnected by the switch unit (SMR) at the time t2. At the time t2, a charge is stored in the storage unit and the terminal voltage VH of the storage unit indicates a high value (terminal voltage VH>allowable terminal voltage VHa). Further, at the time t2, the alternating current motor (MG) is still rotating (rotation speed>allowable rotation speed Ra).

When the terminal voltage VH of the storage unit is high (terminal voltage VH>allowable terminal voltage VHa) or the alternating current motor (MG) is still rotating (rotation speed>allowable rotation speed Ra) at the time t2, the exciting current command value Id* is set at the exciting current discharge value Idd and the torque current command value Iq* is set at zero. As a result, the counter-electromotive power generated by the rotation of the alternating current motor (MG) and the power stored in the storage unit are consumed rapidly in the alternating current motor (MG) while suppressing unintentional torque generation in the alternating current motor (MG).

As shown in FIG. 9, however, the temperature of the alternating current motor (the motor) may increase as the power is consumed. Hence, as shown in FIG. 8B, for example, the exciting current upper limit value Idm is set such that when the motor temperature continues to increase thereafter so as eventually to rise above the predetermined upper limit temperature Tm, the exciting current upper limit value Idm decreases gradually as the motor temperature rises. Eventually, at the time t3, the exciting current upper limit value Idm thus set falls below the initially set exciting current discharge value Idd. Therefore, from the time t3 onward, the exciting current discharge value Idd is corrected to the exciting current upper limit value Idm and the exciting current component Id is controlled so as not to exceed the exciting current upper limit value Idm. As a result, an increase in the motor temperature is suppressed, thereby suppressing overheating of the motor. When the terminal voltage VH of the storage unit falls to or below the allowable terminal voltage VHa and the rotation speed of the alternating current motor falls to or below the allowable rotation speed Ra thereafter at the time t4, the exciting current command value Id* and the torque current command value Iq* are both set at zero.

Hence, with the vehicle control method according to this embodiment, overheating of the inverter and the alternating current motor can be suppressed. With the vehicle control method according to this embodiment, therefore, the charge stored in the storage unit can be discharged more quickly and more safely than with the vehicle control method according to the related art.

(6) Vehicle Control Method According to Fourth Embodiment of the Invention

Figure 10:
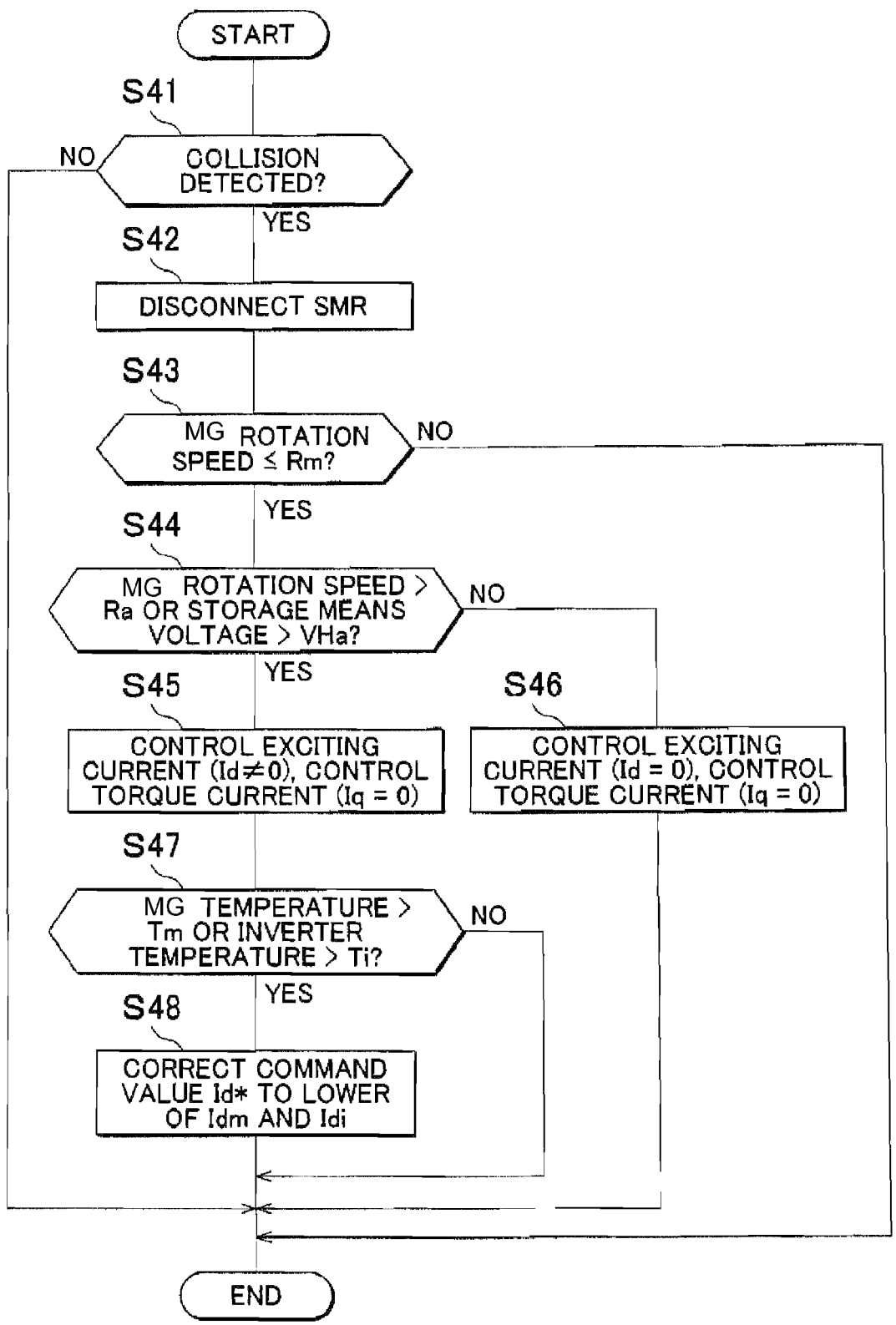
FIG. 10 is a flowchart illustrating a flow of procedures executed in a vehicle control method according to a fourth embodiment of the invention.

FIG. 10 is a flowchart illustrating a processing flow executed in a vehicle control method according to a fourth embodiment of the invention. As shown in FIG. 10, in the vehicle control method according to this embodiment, when it is determined in Step S41 that a vehicle collision has been detected (S41, YES), the electric connection between the power supply and the inverter is disconnected by the switch unit (SMR) in Step S42.

In the vehicle control methods according to the respective embodiments described heretofore, the exciting current component Id and the torque current component Iq of the current supplied to the alternating current motor are then controlled on the basis of whether or not the rotation speed of the alternating current motor is higher than the allowable rotation speed Ra and whether or not the terminal voltage VH of the storage unit is higher than the allowable terminal voltage VHa. In the vehicle control method according to this embodiment, however, a determination is made in Step S43 as to whether or not the rotation speed of the alternating current motor is equal to or lower than the upper limit rotation speed Rm before controlling the exciting current component Id and the torque current component Iq. When it is determined in Step S43 that the rotation speed of the alternating current motor is higher than the upper limit rotation speed Rm (S43, NO), control of the exciting current component Id and the torque current component Iq is reserved. When, on the other hand, it is determined in Step S43 that the rotation speed of the alternating current motor is equal to or lower than the upper limit rotation speed Rm (S43, YES), the exciting current component Id and the torque current component Iq are controlled through processing of Step S44 to Step S47 in a similar manner to the vehicle control methods according to the respective embodiments described heretofore.

Note that the upper limit rotation speed Rm may be set appropriately in accordance with a generation efficiency (a relationship between the rotation speed of the alternating current motor and a current induced by the rotation thereof) when the alternating current motor functions as a generator, configurations (materials and designs of constituent elements, for example) of the alternating current motor and devices and the like on the periphery thereof, and so on, for example.

The processing of Step S43 described above is likewise performed with the aim of suppressing overheating of the inverter and the alternating current motor. In other words, as in the vehicle control methods according to the respective embodiments described heretofore, the exciting current component Id is preferably supplied to the alternating current motor as soon as possible after the vehicle collision is detected to ensure that the charge stored in the storage unit provided in the inverter is discharged quickly. However, when the exciting current component Id is supplied to the alternating current motor to discharge the charge stored in the storage unit in a case where the rotation speed of the alternating current motor at the time of the collision is excessively high, the current flowing to the inverter and the alternating current motor may combine with a current derived from the counter-electromotive power generated by the rotation of the alternating current motor so as to become excessive, and as a result, the inverter and the alternating current motor may overheat.

Hence, in the vehicle control method according to this embodiment, when the rotation speed of the alternating current motor at the time of the collision is excessively high, a start timing at which the exciting current component Id is supplied to the alternating current motor is delayed until the rotation speed of the alternating current motor has decreased and the counter-electromotive power generated by the rotation of the alternating current motor has decreased to ensure that the inverter and the alternating current motor do not overheat. Thus, with the vehicle control method according to this embodiment, the charge stored in the storage unit can be discharged more quickly and more safely than with the vehicle control method according to the related art.

Note that the processing executed in Step S44 to Step S47 following the processing of Step S43 is similar to that of the vehicle control methods according to the respective embodiments described heretofore, and therefore description of this processing will not be repeated.

Figure 11:
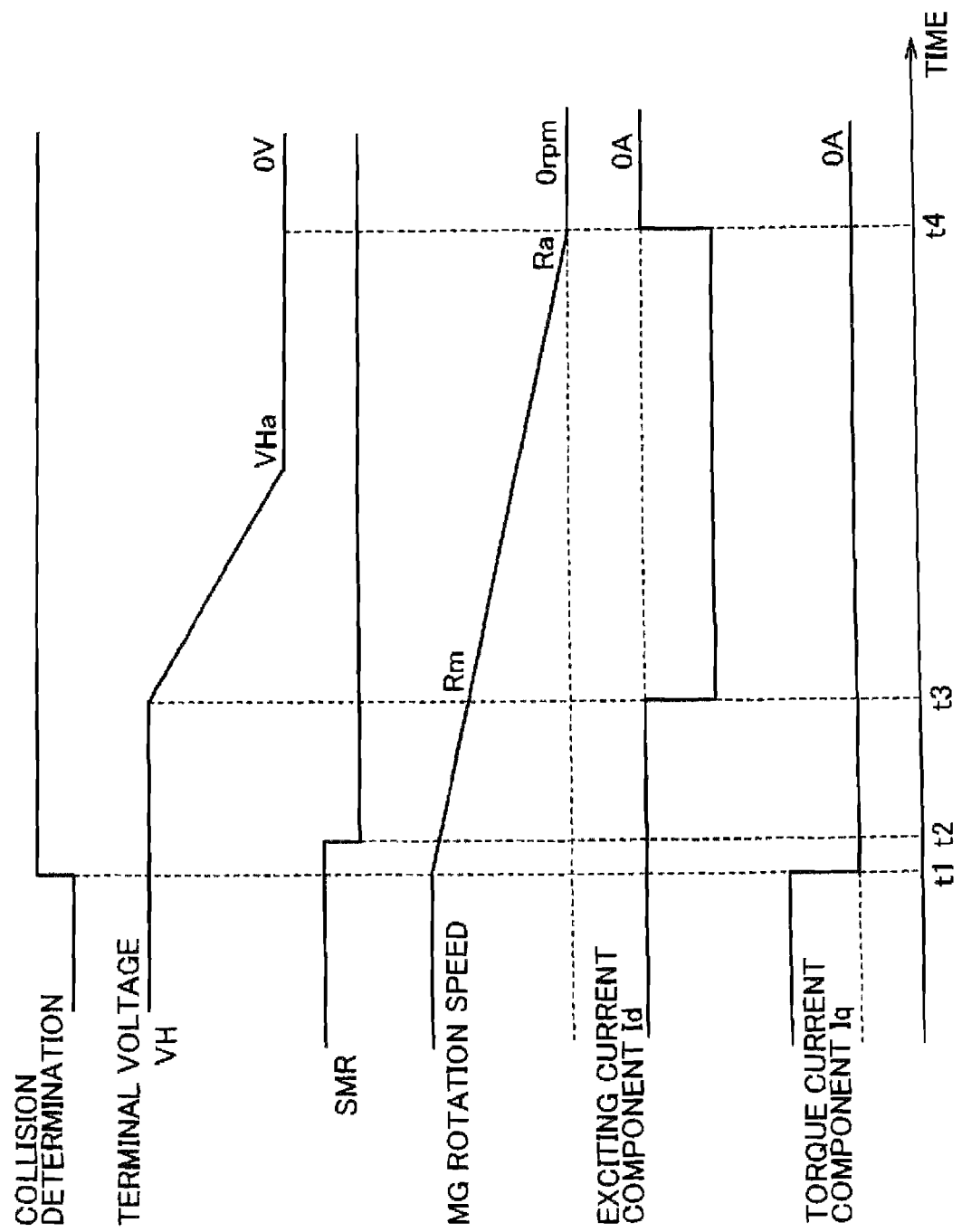
FIG. 11 is a schematic time chart showing temporal variation in statuses and values of various determination items and control items during implementation of the vehicle control method shown in FIG. 10.

FIG. 11 is a schematic time chart showing temporal variation in statuses and values of various determination items and control items during implementation of the vehicle control method shown in FIG. 10. As shown in FIG. 11, in the vehicle control method according to this embodiment, when a vehicle collision is detected at the time t1, the electric connection between the power supply and the inverter is disconnected by the switch unit (SMR) at the time t2. At the time t2, the determination as to whether or not the rotation speed of the alternating current motor is equal to or lower than the upper limit rotation speed Rm is made. As shown in FIG. 11, when the rotation speed of the alternating current motor is higher than the upper limit rotation speed Rm, control of the exciting current component Id and the torque current component Iq is reserved.

Similar processing to that of the vehicle control methods according to the respective embodiments described heretofore is executed only when the rotation speed of the alternating current motor (MG) eventually decreases so as to fall to or below the upper limit rotation speed Rm at the time t3. More specifically, since the terminal voltage VH of the storage unit is high (terminal voltage VH>allowable terminal voltage VHa) and the alternating current motor (MG) is still rotating (rotation speed>allowable rotation speed Ra), the exciting current command value Id* is set at the exciting current discharge value Idd and the torque current command value Iq* is set at zero. When the terminal voltage VH of the storage unit falls to or below the allowable terminal voltage VHa and the rotation speed of the alternating current motor falls to or below the allowable rotation speed Ra thereafter at the time t4, the exciting current command value Id* and the torque current command value Iq* are both set at zero.

Hence, with the vehicle control method according to this embodiment, overheating of the inverter and the alternating current motor can be suppressed. With the vehicle control method according to this embodiment, therefore, the charge stored in the storage unit can be discharged more quickly and more safely than with the vehicle control method according to the related art.

Several embodiments having specific configurations were described above with the aim of illustrating the invention, but the scope of the invention is not limited to these exemplary embodiments, and amendments may of course be added appropriately thereto within the scope of the matter described in the claims and the specification.

What is claimed is:

1. A control apparatus for a vehicle, wherein the vehicle comprises:
   an alternating current motor generator constituted by a permanent magnet synchronous motor;
   a power supply that supplies a direct current;
   an inverter that converts the direct current supplied from the power supply to an input stage of the inverter into an alternating current and supplies the alternating current to the alternating current motor generator;
   a storage unit provided at the input stage of the inverter; and
   a switch unit that switches an electric connection between the power supply and the input stage of the inverter between a disconnected condition and a conductive condition,
   the control apparatus comprising:
   a switching control unit that controls the switch unit;
   a current setting unit that sets an exciting current command value that is a target value of an exciting current component and a torque current command value that is a target value of a torque current component in accordance with an output required of the alternating current motor generator, wherein the exciting current component is a current component of the alternating current, supplied from the inverter to the alternating current motor generator, that is used to excite the alternating current motor generator and the torque current component is a current component of the alternating current, supplied from the inverter to the alternating current motor generator, that is used to apply torque to the alternating current motor generator;
   a current control unit that controls the exciting current component and the torque current component in accordance with the exciting current command value and the torque current command value; and
   a collision detection unit that detects a collision of the vehicle, wherein:
   when the collision of the vehicle is detected by the collision detection unit, the switching control unit controls the switch unit to switch the electric connection between the power supply and the input stage of the inverter to the disconnected condition;
   when a rotation speed of the alternating current motor generator is higher than an allowable rotation speed or a terminal voltage of the storage unit is higher than an allowable terminal voltage after the collision of the vehicle is detected by the collision detection unit, the current setting unit sets the exciting current command value at an exciting current discharge value determined at a value other than zero and sets the torque current command value at zero; and when the rotation speed of the alternating current motor generator is equal to or lower than the allowable rotation speed and the terminal voltage of the storage unit is equal to or lower than the allowable terminal voltage after the collision of the vehicle is detected by the collision detection unit, the current setting unit sets both the exciting current command value and the torque current command value at zero.

2. The control apparatus for a vehicle according to claim 1, wherein, when a temperature of the inverter is higher than a predetermined inverter upper limit temperature, the current setting unit corrects the exciting current command value to a value equal to or lower than an exciting current upper limit value determined in accordance with the temperature of the inverter.

3. The control apparatus for a vehicle according to claim 1, wherein, when a temperature of the alternating current motor generator is higher than a motor upper limit temperature, the current setting unit corrects the exciting current command value to a value equal to or lower than an exciting current upper limit value determined in accordance with the temperature of the alternating current motor generator.

4. The control apparatus for a vehicle according to claim 1, wherein, when a temperature of the inverter is higher than an inverter upper limit temperature and a temperature of the alternating current motor generator is higher than a motor upper limit temperature, the current setting unit corrects the exciting current command value to a value equal to or lower than one of an exciting current upper limit value determined in accordance with the temperature of the inverter and an exciting current upper limit value determined in accordance with the temperature of the alternating current motor generator, which is lower than the other of the exciting current upper limit value and the exciting current upper limit value.

5. The control apparatus for a vehicle according to claim 1, wherein, when the rotation speed of the alternating current motor generator is equal to or higher than an upper limit rotation speed that is higher than the allowable rotation speed, the current setting unit sets the exciting current command value at zero.

6. A control method for a vehicle, wherein the vehicle comprises:

an alternating current motor generator constituted by a permanent magnet synchronous motor;

a power supply that supplies a direct current;

an inverter that converts the direct current supplied from the power supply to an input stage of the inverter into an alternating current and supplies the alternating current to the alternating current motor generator;

a storage unit provided at the input stage of the inverter; and a switch unit that switches an electric connection between the power supply and the input stage of the inverter between a disconnected condition and a conductive condition, the control method comprising:

setting an exciting current command value that is a target value of an exciting current component and a torque current command value that is a target value of a torque current component in accordance with an output required of the alternating current motor generator, wherein the exciting current component is a current component of the alternating current, supplied from the inverter to the alternating current motor generator, that is used to excite the alternating current motor generator and the torque current component is a current component of the alternating current, supplied from the inverter to the alternating current motor generator, that is used to apply torque to the alternating current motor generator;

controlling the exciting current component and the torque current component in accordance with the exciting current command value and the torque current command value;

detecting a collision of the vehicle;

controlling the switch unit to switch the electric connection between the power supply and the input stage of the inverter to the disconnected condition when the collision of the vehicle is detected;

setting the exciting current command value at an exciting current discharge value determined at a value other than zero and setting the torque current command value at zero when a rotation speed of the alternating current motor generator is higher than an allowable rotation speed or a terminal voltage of the storage unit is higher than an allowable terminal voltage after the collision of the vehicle is detected; and setting both the exciting current command value and the torque current command value at zero when the rotation speed of the alternating current motor generator is equal to or lower than the allowable rotation speed and the terminal voltage of the storage unit is equal to or lower than the allowable terminal voltage after the collision of the vehicle is detected.

7. The control method for a vehicle according to claim 6, further comprising correcting the exciting current command value to a value equal to or lower than an exciting current upper limit value determined in accordance with a temperature of the inverter when the temperature of the inverter is higher than an inverter upper limit temperature.

8. The control method for a vehicle according to claim 6, further comprising correcting the exciting current command value to a value equal to or lower than an exciting current upper limit value determined in accordance with a temperature of the alternating current motor generator when the temperature of the alternating current motor generator is higher than a motor upper limit temperature.

9. The control method for a vehicle according to claim 6, further comprising correcting the exciting current command value to a value equal to or lower than one of an exciting current upper limit value determined in accordance with a temperature of the inverter and an exciting current upper limit value determined in accordance with a temperature of the alternating current motor generator, which is lower than the other of the exciting current upper limit value and the exciting current upper limit value, when the temperature of the inverter is higher than an inverter upper limit temperature and the temperature of the alternating current motor generator is higher than a motor upper limit temperature.

10. The control method for a vehicle according to claim 6, further comprising setting the exciting current command value at zero when the rotation speed of the alternating current motor generator is equal to or higher than an upper limit rotation speed that is higher than the allowable rotation speed.

11. A control apparatus for a vehicle, wherein the vehicle comprises:

an alternating current motor constituted by a permanent magnet synchronous motor;

a power supply that supplies a direct current;

an inverter that converts the direct current supplied from the power supply to an input stage of the inverter into an alternating current and supplies the alternating current to the alternating current motor;

a storage unit provided at the input stage of the inverter; and a switch unit that switches an electric connection between the power supply and the input stage of the inverter between a disconnected condition and a conductive condition, the control apparatus comprising:

a switching control unit that controls the switch unit;

a current setting unit that sets an exciting current command value that is a target value of an exciting current component and a torque current command value that is a target value of a torque current component in accordance with an output required of the alternating current motor, wherein the exciting current component is a current component of the alternating current, supplied from the inverter to the alternating current motor, that is used to excite the alternating current motor and the torque current component is a current component of the alternating current, supplied from the inverter to the alternating current motor, that is used to apply torque to the alternating current motor;

a current control unit that controls the exciting current component and the torque current component in accordance with the exciting current command value and the torque current command value; and a collision detection unit that detects a collision of the vehicle, wherein:

when the collision of the vehicle is detected by the collision detection unit, the switching control unit controls the switch unit to switch the electric connection between the power supply and the input stage of the inverter to the disconnected condition;

when a rotation speed of the alternating current motor is higher than an allowable rotation speed after the collision of the vehicle is detected by the collision detection unit, the current setting unit sets the exciting current command value at an exciting current discharge value determined at a value other than zero and sets the torque current command value at zero; and when the rotation speed of the alternating current motor is equal to or lower than the allowable rotation speed and a terminal voltage of the storage unit is equal to or lower than the allowable terminal voltage after the collision of the vehicle is detected by the collision detection unit, the current setting unit sets both the exciting current command value and the torque current command value at zero.

12. The control apparatus for a vehicle according to claim 11, wherein, when a temperature of the inverter is higher than a predetermined inverter upper limit temperature, the current setting unit corrects the exciting current command value to a value equal to or lower than an exciting current upper limit value determined in accordance with the temperature of the inverter.

13. The control apparatus for a vehicle according to claim 11, wherein, when a temperature of the alternating current motor is higher than a motor upper limit temperature, the current setting unit corrects the exciting current command value to a value equal to or lower than an exciting current upper limit value determined in accordance with the temperature of the alternating current motor.

14. The control apparatus for a vehicle according to claim 1, wherein, when a temperature of the inverter is higher than an inverter upper limit temperature and a temperature of the alternating current motor is higher than a motor upper limit temperature, the current setting unit corrects the exciting current command value to a value equal to or lower than one of an exciting current upper limit value determined in accordance with the temperature of the inverter and an exciting current upper limit value determined in accordance with the temperature of the alternating current motor, which is lower than the other of the exciting current upper limit value and the exciting current upper limit value.

15. The control apparatus for a vehicle according to claim 11, wherein, when the rotation speed of the alternating current motor is equal to or higher than an upper limit rotation speed that is higher than the allowable rotation speed, the current setting unit sets the exciting current command value at zero.

* * * * *

UNITED STATES PATENT AND TRADEMARK OFFICE
CERTIFICATE OF CORRECTION

| | |
|---|---|
| PATENT NO. | : 9,114,698 B2 |
| APPLICATION NO. | : 13/597878 |
| DATED | : August 25, 2015 |
| INVENTOR(S) | : Masaya Amano et al. |

Page 1 of 1

It is certified that error appears in the above-identified patent and that said Letters Patent is hereby corrected as shown below:

IN THE SPECIFICATION

In Column 1, Line 29, delete "are" and insert --is--, therefor.
In Column 9, Line 26, delete "VU" and insert --VH--, therefor.
In Column 11, Line 11, delete "white" and insert --while--, therefor.
In Column 16, Line 14, delete "Ram" and insert --Rm--, therefor.
In Column 16, Line 56, after "M/G", insert --140--.
In Column 21, Line 31, delete "aim" and insert --arm--, therefor.
In Column 21, Line 31, delete "TORT" and insert --IGBT--, therefor.
In Column 21, Line 50, delete "TORT" and insert --IGBT--, therefor.

Signed and Sealed this
Eighth Day of March, 2016

Michelle K. Lee
*Director of the United States Patent and Trademark Office*